US012732246B2

(12) United States Patent
Huang et al.

(10) Patent No.: US 12,732,246 B2
(45) Date of Patent: Sep. 8, 2026

(54) SIGNAL PROCESSING METHOD AND RELATED APPARATUS

(71) Applicant: HUAWEI TECHNOLOGIES CO., LTD., Shenzhen (CN)

(72) Inventors: Hui Huang, Shanghai (CN); Weiwei Tian, Shenzhen (CN); Xinbo Jin, Dongguan (CN); Zhen Sun, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 18/656,125

(22) Filed: May 6, 2024

(65) Prior Publication Data

US 2024/0297696 A1 Sep. 5, 2024

Related U.S. Application Data

(63) Continuation of application No. PCT/CN2022/114306, filed on Aug. 23, 2022.

(30) Foreign Application Priority Data

Nov. 8, 2021 (CN) ......................... 202111316446.1

(51) Int. Cl.
*H04B 7/06* (2006.01)
*H04B 7/024* (2017.01)

(52) U.S. Cl.
CPC ........... *H04B 7/0617* (2013.01); *H04B 7/024* (2013.01)

(58) Field of Classification Search
CPC .............................. H04B 7/024; H04B 7/0617
(Continued)

(56) References Cited

U.S. PATENT DOCUMENTS 9,912,390 B2 * 3/2018 Sun ...................... H04B 7/0456
2007/0207769 A1 9/2007 Hara
2020/0374814 A1 11/2020 Gong et al.

FOREIGN PATENT DOCUMENTS

CN 102395185 A 3/2012
CN 103259581 A 8/2013
(Continued)

OTHER PUBLICATIONS

3GPP TSG RAN WG1 Meeting #82, R1-154395, “Effect of antenna virtualization on CSI-RS coverage in EBF/FD MIMO”, Beijing, China, Aug. 24-28, 2015, total 4 pages.

*Primary Examiner* — Peter G Solinsky
(74) *Attorney, Agent, or Firm* — WOMBLE BOND DICKINSON (US) LLP

(57) ABSTRACT

This application provides a signal processing method and a related apparatus. The method is applied to a network device and includes: receiving sounding signal information from user equipment, where the sounding signal information includes N pieces of sub-sounding signal information received by N antennas of the network device; performing first weighting processing on the sounding signal information based on a first matrix to determine first signal information; determining a channel weight of to-be-sent signal information based on the first signal information, and weighting the to-be-sent signal information based on the channel weight, to determine N pieces of second signal information; performing second weighting processing on the N pieces of second signal information based on a second matrix to obtain N pieces of third signal information, where the second matrix is an inverse matrix of the first matrix; and sending the corresponding third signal information using the N antennas.

15 Claims, 10 Drawing Sheets

(58) Field of Classification Search
USPC .......................................................... 370/330
See application file for complete search history.

(56) References Cited

FOREIGN PATENT DOCUMENTS

| | | |
|---|---|---|
| CN | 110768698 A | 2/2020 |
| CN | 114244414 A | 3/2022 |

* cited by examiner

SIGNAL PROCESSING METHOD AND RELATED APPARATUS

CROSS-REFERENCE TO RELATED APPLICATIONS

This application is a continuation of International Application No. PCT/CN2022/114306, filed on Aug. 23, 2022, which claims priority to Chinese Patent Application No. 202111316446.1, filed on Nov. 8, 2021. The disclosures of the aforementioned applications are incorporated herein by reference in these entireties.

TECHNICAL FIELD

This application relates to the field of communication technologies, and in particular, to a signal processing method and a related apparatus for a distributed antenna system.

BACKGROUND

As a quantity of mobile users in cities rapidly increases, indoor traffic density and coverage requirements are also increasing rapidly. Currently, about 70% of traffic occurs indoors, leading to urgent requirements for developing indoor coverage scenarios. When signal coverage of a conventional macro base station (antennas are centrally distributed at sites) extends from an outdoor area to an indoor area, it is difficult to meet indoor service requirements due to penetration loss, signal transmission blocking by buildings, and the like. As a result, there are many blind areas during indoor coverage, such as underground parking lots, staircases, and elevators.

To meet indoor coverage requirements in a cost-effective manner, a distributed antenna system (DAS) uses disperse antennas to transmit signals to appropriate locations, for example, by avoiding obstacles such as floors. In a conventional distributed antenna system, a plurality of antenna feeder systems share one remote radio unit (RRU) system, and antennas used to cover different areas are directly connected to RRUs through feeders. When user equipment is in a coverage area of one of the antenna feeder systems, because the user equipment is not in a coverage area of another antenna feeder system, an antenna of the another antenna feeder system may transmit no signal or a transmitted signal cannot be received by a user, that is, the user equipment is covered mainly by using an antenna feeder system corresponding to a single channel of the RRU system. Due to limited power of the single channel, a coverage area of the distributed antenna system is limited.

SUMMARY

Embodiments of this application disclose a signal processing method and a related apparatus, so that power sharing between channels of a remote radio unit can be implemented based on uplink channel quality of an antenna in an area in which a user is located, thereby adjusting transmit power of the antenna corresponding to the area in which the user is located, and improving an overall coverage area of a distributed antenna system.

A first aspect of this application discloses a signal processing method, applied to a network device including a plurality of feed source channels. The method includes: receiving sounding signal information from user equipment, where the sounding signal information includes N pieces of sub-sounding signal information received by N antennas of the network device, and N is an integer greater than or equal to 2; performing first weighting processing on the sounding signal information based on a first matrix, to determine first signal information, where the first matrix is an N-dimensional unitary matrix; determining a channel weight of to-be-sent signal information based on the first signal information, and weighting the to-be-sent signal information based on the channel weight, to determine N pieces of second signal information; performing second weighting processing on the N pieces of second signal information based on a second matrix, to obtain N pieces of third signal information, where the second matrix is an inverse matrix of the first matrix; and sending the corresponding third signal information by using the N antennas of the network device.

According to the signal information processing method provided in this embodiment of this application, after receiving the sounding signal information sent by the user equipment, antennas of a distributed antenna system performs weighting processing on the sounding signal information based on the first matrix, to obtain the first signal information; determines the channel weight based on the first signal information, and weights, based on the channel weight, the to-be-sent signal information corresponding to a channel of an RRU, to obtain the second signal information; performs weighting processing on the second signal information based on the inverse matrix of the first matrix, to obtain the third signal information; and sends the third signal information by using the antennas. In this way, the channel weight of the to-be-sent signal information corresponding to the channel is determined based on the sounding signal information of the user equipment (UE) that is received by the antenna of the distributed antenna system, and power of each channel is reallocated based on uplink channel quality of the user equipment under different antennas by using the channel weight and weighted processing, so that channel power sharing of a plurality of channels of the distributed antenna system is implemented, and transmit power of each antenna is no longer limited to maximum power of a corresponding channel.

Transmit power of a single antenna of the distributed antenna is increased, so as to increase overall available transmit power of the distributed antenna system, thereby improving overall coverage performance of the distributed antenna system.

With reference to the first aspect, in some implementations of the first aspect, coverage areas of at least two of the N antennas are different.

Because coverage areas of different antennas are different, when the UE is in a coverage area of the distributed antenna system, quality of an uplink channel between the UE and an RRU system varies with a coverage area of an antenna, and transmit power of an antenna corresponding to each channel may be reallocated based on different uplink channel quality, so as to increase transmit power of an antenna with better uplink channel quality, thereby improving a coverage area of an antenna in which the UE is located, and improving quality of communication between the UE and the distributed antenna system.

With reference to the first aspect, in some implementations of the first aspect, N=2M, M is an integer greater than or equal to 1, and the first matrix is a matrix determined by a Kronecker product obtained by multiplying N matrices $$\begin{bmatrix} 1 & j \\ j & 1 \end{bmatrix} \text{ or } \begin{bmatrix} 1 & -j \\ -j & 1 \end{bmatrix}.$$

A quantity of channels of the RRU system is limited by limiting N to an even number greater than or equal to 2, for example, 2, 4, or 8.

With reference to the first aspect, in some implementations of the first aspect, if N=2, a mathematical form of the second matrix is $$\begin{bmatrix} 1 & j \\ j & 1 \end{bmatrix};$$

if N=4, a mathematical form of the second matrix is, $$\begin{bmatrix} 1 & j & j & -1 \\ j & -1 & 1 & j \\ j & 1 & -1 & j \\ -1 & j & j & 1 \end{bmatrix};$$

or if N=8, a mathematical form of the second matrix is $$\begin{bmatrix} 1 & j & j & -1 & j & -1 & -1 & -j \\ j & -1 & -1 & -j & 1 & j & j & -1 \\ j & 1 & -1 & j & -1 & j & -j & -1 \\ -1 & j & -j & -1 & j & 1 & -1 & j \\ j & -1 & 1 & j & -1 & -j & j & -1 \\ -1 & -j & j & -1 & j & -1 & 1 & j \\ -1 & j & j & 1 & -j & -1 & -1 & j \\ -j & -1 & -1 & j & -1 & j & j & 1 \end{bmatrix}.$$

With reference to the first aspect, in some implementations of the first aspect, the second signal information is in one-to-one correspondence with the third signal information, and the third signal information is in one-to-one correspondence with the antennas.

A second aspect of this application discloses a signal processing apparatus, including: a communication unit, configured to receive sounding signal information sent by user equipment, where the sounding signal information includes N pieces of sub-sounding signal information received by N antennas of a network device, and N is an integer greater than or equal to 2; a processing unit, configured to perform first weighted processing on the sounding signal information based on a first matrix, to determine first signal information, where the first matrix is an N-dimensional unitary matrix; and a determining unit, configured to: determine a channel weight of to-be-sent signal information based on the first signal information, and weight the to-be-sent signal information based on the channel weight, to determine N pieces of second signal information. The processing unit is further configured to perform second weighted processing on the N pieces of second signal information based on a second matrix, to obtain N pieces of third signal information, where the second matrix is an inverse matrix of the first matrix. The communication unit is further configured to send the corresponding third signal information by using the N antennas.

With reference to the second aspect, in some implementations of the second aspect, coverage areas of at least two of the N antennas are different.

With reference to the second aspect, in some implementations of the second aspect, N=2M, M is an integer greater than or equal to 1, and the first matrix is a matrix determined by a Kronecker product obtained by multiplying N matrices $$\begin{bmatrix} 1 & j \\ j & 1 \end{bmatrix} \text{ or } \begin{bmatrix} 1 & -j \\ -j & 1 \end{bmatrix}.$$

With reference to the second aspect, in some implementations of the second aspect, if N=2, a mathematical form of the second matrix is $$\begin{bmatrix} 1 & j \\ j & 1 \end{bmatrix};$$

if N=4, a mathematical form of the second matrix is $$\begin{bmatrix} 1 & j & j & -1 \\ j & -1 & 1 & j \\ j & 1 & -1 & j \\ -1 & j & j & 1 \end{bmatrix};$$

or if N=8, a mathematical form of the second matrix is $$\begin{bmatrix} 1 & j & j & -1 & j & -1 & -1 & -j \\ j & -1 & -1 & -j & 1 & j & j & -1 \\ j & 1 & -1 & j & -1 & j & -j & -1 \\ -1 & j & -j & -1 & j & 1 & -1 & j \\ j & -1 & 1 & j & -1 & -j & j & -1 \\ -1 & -j & j & -1 & j & -1 & 1 & j \\ -1 & j & j & 1 & -j & -1 & -1 & j \\ -j & -1 & -1 & j & -1 & j & j & 1 \end{bmatrix}.$$

With reference to the second aspect, in some implementations of the second aspect, the second signal information is in one-to-one correspondence with the third signal information, and the third signal information is in one-to-one correspondence with the antennas.

According to a third aspect, a network device is provided, including a transceiver, a processor, and a memory. The processor is configured to control the transceiver to transmit and receive signal information. The memory is configured to store a computer program. The processor is configured to invoke the computer program from the memory and run the computer program, so that the network device is enabled to perform the method in any one of the first aspect and the possible implementations of the first aspect.

According to a fourth aspect, a computer program product is provided. The computer program product includes computer program code. When the computer program code is run on a computer, the computer is enabled to perform the method in the foregoing aspect.

According to a fifth aspect, a computer-readable medium is provided. The computer-readable medium stores program code. When the program code is run on a computer, the computer is enabled to perform the method in the foregoing aspect.

According to a sixth aspect, a chip system is provided. The chip system includes a processor, configured to support a network device in implementing functions in the foregoing aspect, for example, generating, receiving, determining, sending, or processing data and/or information in the foregoing method. In one embodiment, the chip system further includes a memory. The memory is configured to store program instructions and data for a terminal device. The chip system may include a chip, or may include a chip and another discrete device.

It should be understood that the signal processing apparatus in the second aspect, the network device in the third aspect, the computer program product in the fourth aspect, the computer-readable storage medium in the fifth aspect, and the chip system in the sixth aspect all correspond to the method in the first aspect. Therefore, for beneficial effects that can be achieved by the signal processing apparatus in the second aspect, the network device in the third aspect, the computer program product in the fourth aspect, the computer-readable storage medium in the fifth aspect, and the chip system in the sixth aspect, refer to the beneficial effects in the corresponding method provided above. Details are not described herein again.

DESCRIPTION OF EMBODIMENTS

For ease of understanding, examples of some concepts related to embodiments of this application are described for reference.

It should be noted that, in this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. In the specification, claims, and accompanying drawings of this application, the terms "first", "second", "third", "fourth", and the like (if any) are intended to distinguish between similar objects but do not necessarily indicate a particular order or sequence.

The following first describes related terms and concepts that may be used in embodiments of this application.

A unitary matrix indicates that a Hermitian conjugate matrix is equal to an inverse matrix. For a real matrix, Hermitian conjugate is transposition, and therefore real orthogonal representation is that a transposition matrix is equal to an inverse matrix. Real orthogonal representation is a special example of unitary representation.

A 90° electrical bridge, that is, a same-band combiner, is configured to continuously sample transmit power in a determined direction of a transmission line, and can divide an input signal into two signals with an equal amplitude and a 90° phase difference.

Figure 1:
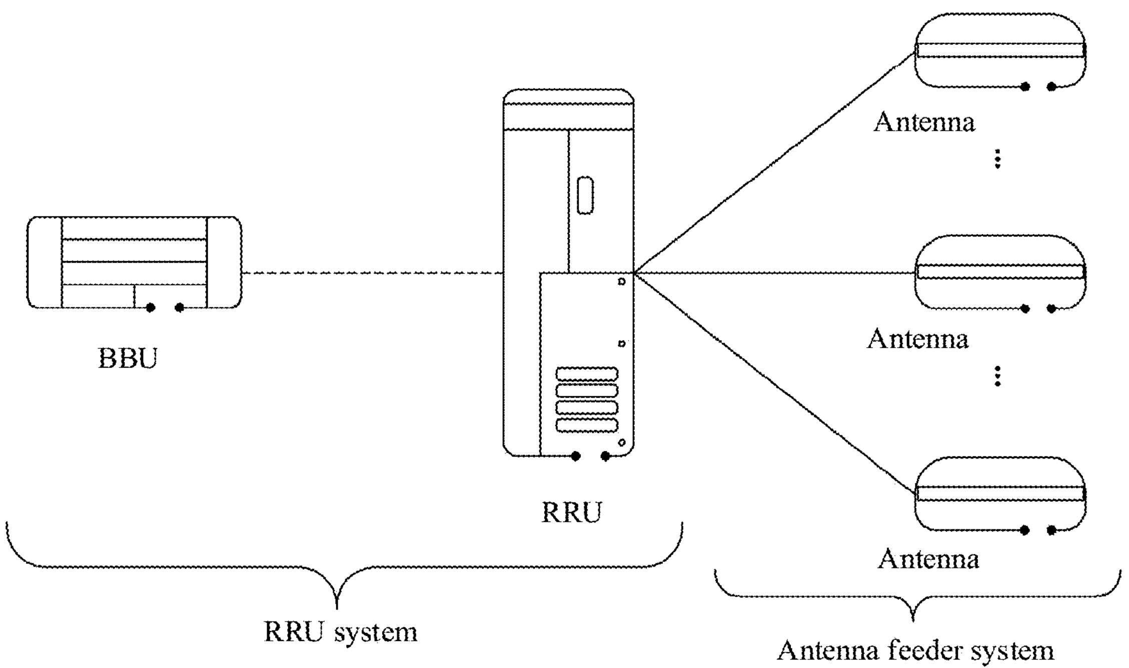
FIG. 1 is a diagram of a distributed antenna system according to an embodiment of this application.

FIG. 1 is a diagram of an environment of a multi-channel distributed antenna system according to this application. The distributed antenna system includes an RRU system and an antenna feeder system. The RRU system may include one or more baseband processing units (BBUs) and one or more RRUs. The BBU is a control center of the RRU system, and is mainly configured to perform baseband processing, such as channel coding, multiplexing, modulation, and spectrum spreading, and control the RRU system. The RRU may also be referred to as a transceiver unit, a transceiver, or a transceiver circuit, and may include a radio frequency unit. The RRU is mainly configured to receive and send a radio frequency signal, and perform conversion between the radio frequency signal and a baseband signal, for example, configured to send a signaling message to user equipment (UE), and allocate power to a baseband signal. It should be understood that the RRU and the BBU may be physically disposed together, or may be physically disposed separately. For example, in a distributed base station shown in FIG. 1, the RRU and the BBU are connected by using an optical fiber. This is not limited in this application.

The antenna feeder system includes at least two antennas and feeders connecting the antennas and the RRU. In FIG. 1, the at least two antennas share one RRU system, and the at least two antennas cover different areas. When the user equipment is located in a coverage area of one of the antennas, the RRU system does not transmit a signal by using another antenna, or a signal transmitted by using another antenna cannot be received by the user equipment. Because each channel of the RRU system corresponds to one antenna, if the user equipment is located in a coverage area of only one of the antennas, the RRU system can cover the user equipment only by using a single channel. Due to limited power of the single channel, an overall coverage area of the distributed antenna system is limited.

The user equipment in the distributed antenna system may be a terminal, a mobile station (MS), a mobile terminal (MT), or the like. The user equipment in this embodiment of this application may be a mobile phone, a tablet computer (Pad), or a computer that has a wireless transceiver function, or may be a wireless terminal used in scenarios such as virtual reality (VR), augmented reality (AR), industrial control, self-driving, telemedicine, smart grid, transportation safety, smart city, and smart home. In this application, the foregoing user equipment and a chip that can be used in the foregoing user equipment are collectively referred to as user equipment. It should be understood that a particular technology used by the user equipment and a particular device form of the user equipment are not limited in this embodiment of this application.

Figure 2A:
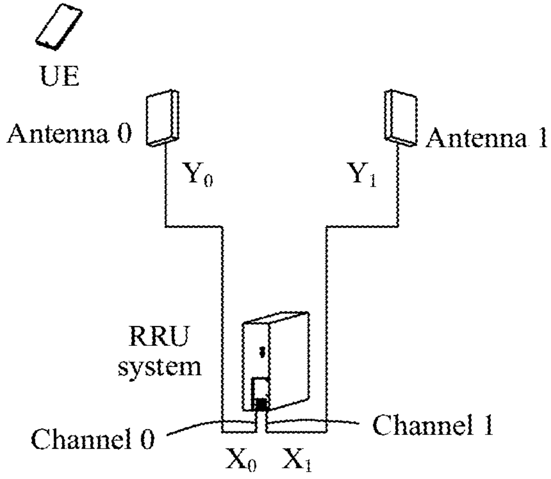
FIG. 2*a* is a diagram of a two-channel distributed antenna system according to an embodiment of this application.

FIG. 2*a* is a diagram of a two-channel distributed antenna system according to this application. An RRU system of the distributed antenna system has two channels: a channel 0 and a channel 1. The channel 0 corresponds to an antenna 0 of an antenna feeder system, and the channel 1 corresponds to an antenna 1 of the antenna feeder system. $X_0$ and $X_1$ respectively represent signal information received by ports of the channel 0 and the channel 1 of the RRU, and $Y_0$ and $Y_1$ respectively represent signal information received by the antenna 0 and the antenna 1. Because the antenna is directly connected to the RRU through a feeder, the signal information on the corresponding port of the RRU is approximately equal to the signal information received by the antenna port, that is, $RX_0=RY_0$ and $RX_1=RY_1$.

Figure 2B:
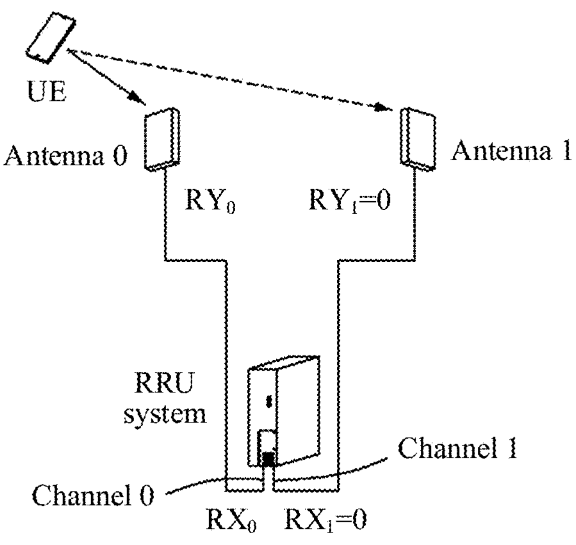
FIG. 2*b* is a diagram of receiving sounding signal information in a two-channel distributed antenna system according to an embodiment of this application.

In FIG. 2*b*, coverage areas of the antenna 0 and the antenna 1 are different and have no overlapping area, and UE is located in the coverage area of the antenna 0 corresponding to the channel 0. When the UE sends sounding signal information to the RRU system, only the antenna 0 can receive the sounding signal information sent by the UE, but the antenna 0 cannot receive the sounding signal information sent by the UE.

The sounding signal information may be sounding reference signal (SRS) information. In wireless communication, the sounding reference signal information is used to estimate frequency domain information of an uplink channel and perform selective frequency scheduling, and is further used to estimate a downlink channel and perform downlink beamforming.

The RRU system determines, based on the received sounding signal information, that a channel condition from the UE to the channel 1 is very poor. In an extreme case in which noise is ignored, $RX_1=RY_1=0$, that is, quality of an uplink channel from the UE to the RRU system is very poor, and the RRU system cannot communicate with the UE by using the antenna 1 corresponding to the channel 1.

Figure 2C:
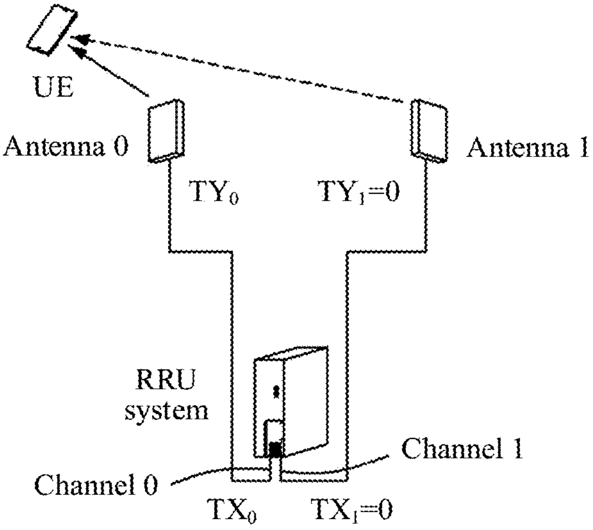
FIG. 2*c* is a diagram of sending downlink signal information in a two-channel distributed antenna system according to an embodiment of this application.

As shown in FIG. 2*c*, the distributed antenna system sends downlink signal information to the UE, and signal information sent by the channel 0 and the channel 1 is respectively $TX$, and $TX_1$. Because a channel condition of the channel 1 is very poor, power of $X_1$ is very low. In an extreme case, $X_1=0$, that is, the distributed antenna system sends the signal information $TX_0$ only by using the channel 0. Because maximum power of a single channel of the RRU is limited, a coverage area of an antenna for sending the downlink signal information is limited.

When the RRU system sends downlink data to the UE, transmit power of antennas corresponding to channels is independent of each other. When the user equipment is located in a coverage area of an antenna corresponding to only one of the channels, or the user equipment is located in coverage areas of at least two antennas, but uplink channel quality of channels corresponding to the at least two antennas is different, transmit power corresponding to the channels is fixed and cannot be shared when the RRU system sends the downlink data. As a result, an antenna corresponding to a coverage area in which the user equipment is located or an antenna corresponding to a channel with relatively good uplink channel quality of the user equipment can use only maximum power of the channel corresponding to the antenna, and consequently power of the antenna corresponding to the coverage area in which the user equipment is located is limited.

Based on the foregoing problem, this application provides a signal information processing method. After receiving sounding signal information sent by user equipment, antennas of a distributed antenna system performs weighting processing on the sounding signal information based on a first matrix, to obtain first signal information; determines a channel weight based on the first signal information, and weights, based on the channel weight, to-be-sent signal information corresponding to a channel of an RRU, to obtain second signal information; performs weighting processing on the second signal information based on an inverse matrix of the first matrix, to obtain third signal information; and sends the third signal information by using the antennas. In this way, the channel weight of the to-be-sent signal information corresponding to the channel is determined based on the sounding signal information of the UE that is received by the antenna of the distributed antenna system, and power of each channel is reallocated based on uplink channel quality of the user equipment under different antennas by using the channel weight and weighted processing, so that channel power sharing of a plurality of channels of the distributed antenna system is implemented, and transmit power of each antenna is no longer limited to maximum power of a corresponding channel. Transmit power of a single antenna of the distributed antenna is increased, so as to increase overall available transmit power of the distributed antenna system, thereby improving overall coverage performance of the distributed antenna system.

The first matrix is an N-dimensional unitary matrix, and N is an integer greater than or equal to 2.

In some embodiments, the first matrix is a matrix determined based on discrete Fourier transform (DFT), where a mathematical calculation formula may be represented as DFT(N); or the first matrix is a matrix determined by a Kronecker product obtained by multiplying N matrices $$\begin{bmatrix} 1 & j \\ j & 1 \end{bmatrix} \text{ or } \begin{bmatrix} 1 & -j \\ -j & 1 \end{bmatrix}.$$

Figure 3:
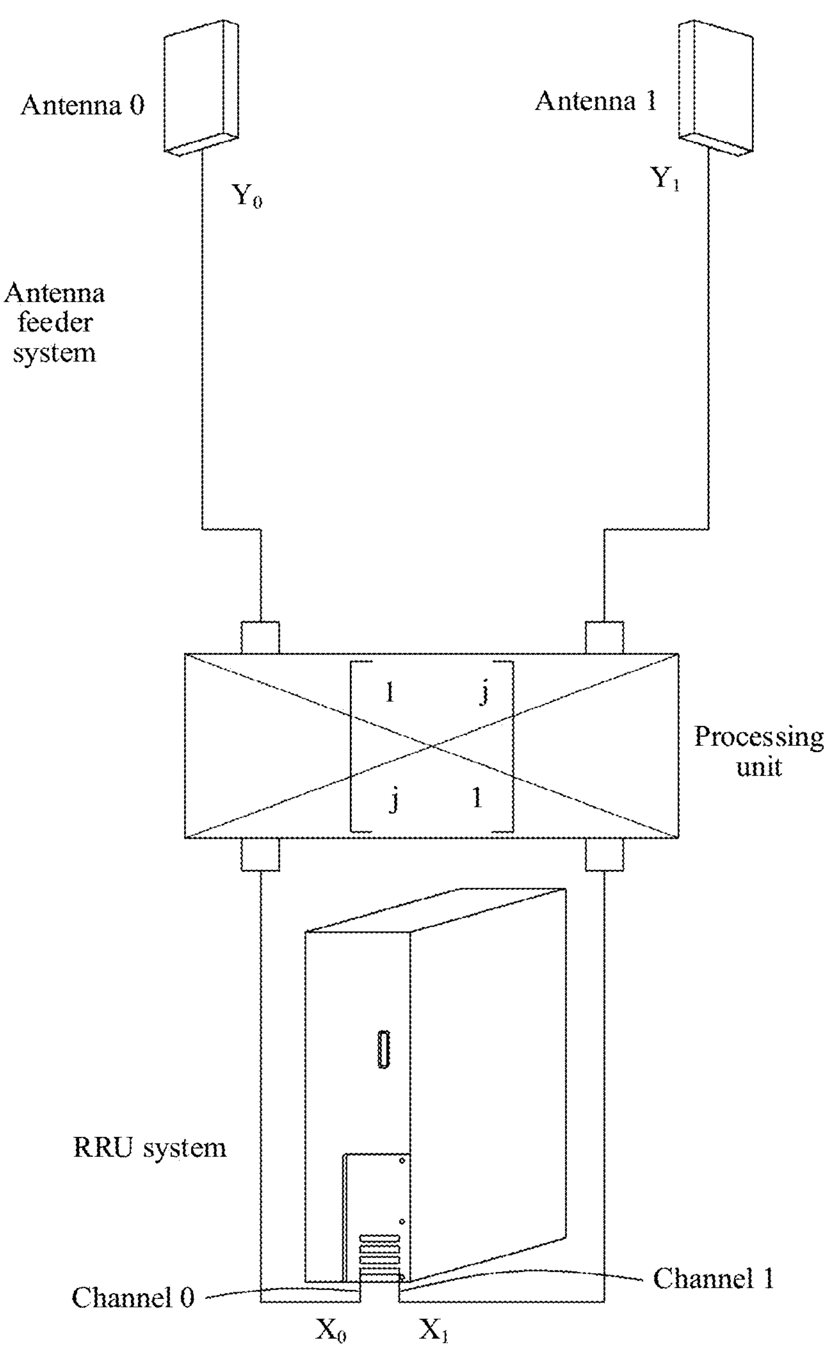
FIG. 3 is a diagram of another two-channel distributed antenna system according to an embodiment of this application.

FIG. 3 is a diagram of a two-channel distributed antenna system that can implement a signal processing method according to this application. FIG. 3 is similar to FIG. 2*a*. The distributed antenna system includes an RRU system and an antenna feeder system. A difference lies in that the distributed antenna system further includes a processing unit. The processing unit is located between the RRU system and the antenna feeder system, and the processing unit is configured to: process, based on a first matrix, sounding signal information transmitted by the antenna feeder system, and transmit processed signal information to the RRU system; and process, based on a second matrix, to-be-sent signal information sent by the RRU system, and transmit processed to-be-sent signal information to the antenna feeder system. The second matrix is an inverse matrix of the first matrix.

In an embodiment, the processing unit is a 90° electrical bridge, the electrical bridge is located between the RRU system and the antenna feeder system, one side of the bridge is connected to the RRU, and the other side of the electrical bridge is connected to an antenna.

In this embodiment, the RRU has two channels, and the antenna feeder system has two antennas. The electrical bridge has two sides: a first side and a second side. There are two ports on each of the first side and the second side. The two ports on the first side of the electrical bridge are respectively correspondingly connected to the two channels of the RRU, and the two ports on the second side are respectively correspondingly connected to the two antennas.

When signal information is input to the electrical bridge from the second side and output from the electrical bridge from the first side, the electrical bridge performs first weighting processing on the signal information based on a first matrix. When signal information is input to the electrical bridge from the first side and output from the electrical bridge from the second side, the electrical bridge performs second weighting processing on the signal information based on a second matrix. The second matrix is an inverse matrix of the first matrix.

Herein, $X_0$ and $X_1$ respectively represent signal information on ports of a channel 0 and a channel 1 of the RRU, $RX_0$ and $RX_1$ respectively represent signal information received by the ports of the channel 0 and the channel 1 of the RRU, and $TX_0$ and $TX_1$ respectively represent signal information sent by the ports of the channel 0 and the channel 1 of the RRU; and $Y_0$ and $Y_1$ respectively represent signal information on antenna ports, $RY_0$ and $RY_1$ respectively represent signal information received by the antenna ports, and $TY_0$ and $TY_1$ respectively represent signal information sent by the antenna ports. The foregoing rule is applicable to subsequent implementation of this application, and details are not described subsequently.

In some embodiments, the antennas of the antenna feeder system receive sounding signal information $$\begin{bmatrix} RY_0 \\ RY_1 \end{bmatrix}$$

sent by user equipment, where $RY_0$ and $RY_1$ respectively represent sounding signal information received by an antenna 0 and an antenna 1; and obtains first signal information after performing first weighting processing the sounding signal information by using the electrical bridge.

$$\begin{bmatrix} RX_0 \\ RX_1 \end{bmatrix} = \frac{1}{\sqrt{2}} \begin{bmatrix} 1 & j \\ j & 1 \end{bmatrix}^{-1} \begin{bmatrix} RY_0 \\ RY_1 \end{bmatrix} = \frac{1}{\sqrt{2}} \begin{bmatrix} RY_0 - jRY_1 \\ -jRY_0 + RY_1 \end{bmatrix}.$$

The first signal information includes two pieces of sub-signal information corresponding to the two channels of the RRU: $RX_0$ and $RX_1$, the first matrix is $$\begin{bmatrix} 1 & j \\ j & 1 \end{bmatrix}^{-1}.$$

and the electrical bridge is circuit implementation of the first matrix.

In some embodiments, coverage areas of the antenna 0 and the antenna 1 of the antenna feeder system are different, and the coverage areas of the antenna 0 and the antenna 1 have an overlapping area. The user equipment is located in the overlapping area. In this case, both the antennas corresponding to the two channels of the RRU may receive the sounding signal information sent by the UE, where the sounding signal information received by the antenna 0 is $RY_0$, and the sounding signal information received by the antenna 1 is $RY_1$, and $Y_1=\alpha Y_0$, where $|\alpha|<<1$, and a is a complex number. That is, quality of an uplink channel between the antenna 0 and the UE is better, and quality of an uplink channel between the antenna 1 and the UE is poorer.

The sounding signal information output by the antenna feeder system is input to the electrical bridge from the second side of the electrical bridge, and the electrical bridge performs first weighting processing on the sounding signal information to obtain the first signal information:

$$\begin{bmatrix} RX_0 \\ RX_1 \end{bmatrix} = \frac{1}{\sqrt{2}} \begin{bmatrix} 1 & j \\ j & 1 \end{bmatrix}^{-1} \begin{bmatrix} RY_0 \\ \alpha RY_0 \end{bmatrix} = \frac{1}{\sqrt{2}} \begin{bmatrix} (1-\alpha j)RY_0 \\ (\alpha - j)RY_0 \end{bmatrix}.$$

In this case, the sub-signal information received by the channel 0 or die RRU is $$RX_0 = \frac{(1-aj)}{\sqrt{2}} RY_0,$$

and the sub-signal information received by the channel 1 of the RRU is $$RX_1 = \frac{(a-j)}{\sqrt{2}} RY_0.$$

A BBU determines channel weights corresponding to the channel 0 and the channel 1 from the UE to the RRU based on the sub-signal information received by the channels:

$$h_0 = \frac{1-\alpha j}{\sqrt{2}} \text{ and } h_1 = \frac{\alpha - j}{\sqrt{2}},$$

where $$|h_0| = |h_1| = \frac{\sqrt{1+\alpha^2}}{\sqrt{2}}, \text{ and } \gamma = \max\{|h_0|, |h_1|\} = \frac{\sqrt{1+\alpha^2}}{\sqrt{2}}.$$

Herein, $h_0$ is the channel weight corresponding to the channel 0, and $h_1$ is the channel weight corresponding to the channel 1.

In this way, both the two channels of the RRU system can be used for data transmission, and the signal information received by the two channels has same power but a 90° phase difference.

In this way, the sounding signal information received by the two antennas is adjusted through first weighting processing. Adjusted sounding signal information received by the channels of the RRU system is not 0, and the BBU determines, based on the adjusted sounding signal information, that both the antennas corresponding to the two channels can receive the sounding signal information sent by the UE. In this case, when the RRU system sends downlink signal information to the UE, the RRU system determines that the channels can be used to send the downlink signal information.

When the RRU system sends the downlink signal information to the UE, the BBU weights the downlink signal information based on the channel weights. If the downlink signal information of the two channels is $TX_0$, after the BBU weights the downlink signal information of the two channels, the signal information sent by the two channels of the RKU is respectively $$\frac{h_0 TX_0}{\gamma} \text{ and } \frac{h_1 TX_0}{\gamma}.$$

The downlink signal information output by the RRU is input to the electrical bridge from the first side of the electrical bridge, and the electrical bridge performs, based on the second matrix, second weighting processing on the signal information sent by the RRU:

$$\begin{bmatrix} TY_0 \\ TY_1 \end{bmatrix} = \frac{1}{\sqrt{2}}\begin{bmatrix} 1 & j \\ j & 1 \end{bmatrix}\begin{bmatrix} \frac{h_0 TX_0}{\gamma} \\ \frac{h_1 TX_0}{\gamma} \end{bmatrix} = \begin{bmatrix} \frac{\sqrt{2}}{\sqrt{1+\alpha^2}} TX_0 \\ \frac{\sqrt{2}\alpha}{\sqrt{1+\alpha^2}} TX_0 \end{bmatrix}.$$

Herein, $TY_0$ is signal information sent by the antenna 0, $TY_1$ is signal information sent by the antenna 1, and the second matrix is $$\begin{bmatrix} 1 & j \\ j & 1 \end{bmatrix}.$$

If the electrical bridge performs weighting processing on the signal information sent by the RRU, the signal information sent by the antenna $$0\ TY_0 = \frac{\sqrt{2}}{\sqrt{1+\alpha^2}} TX_0,$$

and the signal information sent by the antenna $$1\ TY_1 = \frac{\sqrt{2}\alpha}{\sqrt{1+\alpha^2}} TX_0.$$

Assuming that power of the channels of the RRU system is 1, total power of the signal information transmitted by the two antennas is:

$$\left(\frac{\sqrt{2}}{\sqrt{1+\alpha^2}}\right)^2 + \left(\frac{\sqrt{2}\alpha}{\sqrt{1+\alpha^2}}\right)^2 = 2,$$

that is, the transmit power of the signal information transmitted by the two antennas is equal to total available power of the channels of the RRU system. That is, the power of the two channels of the RRU antenna system is reallocated by adding the processing unit, the total available transmit power of the two channels remains unchanged, and transmit power $$\left(\frac{\sqrt{2}}{\sqrt{1+\alpha^2}}\right)^2$$

of an antenna with better uplink channel quality is greater than transmit power $$\left(\frac{\sqrt{2}\alpha}{\sqrt{1+\alpha^2}}\right)^2$$

of an antenna with poorer downlink channel quality. In this way, power is reallocated to the channels, so that larger transmit power is allocated to the antenna with better uplink channel quality, and smaller transmit power is allocated to the antenna with poorer downlink channel quality. In addition, because the user equipment is located in a coverage area of the antenna with better downlink channel quality, the transmit power of the antenna is increased, so as to improve the coverage area of the antenna, and improve communication quality of the user equipment.

Refer to FIG. 2*a* again. No processing unit is disposed between the antenna feeder system and the RRU in the distributed antenna system. After the antennas of the antenna feeder system receive sounding signal information, the antenna feeder system directly transmits the sounding signal information to the RRU system. The BBU of the RRU system determines, based on the sounding signal information of the antennas corresponding to the two channels, channel weights corresponding to the two channels: $h'_0=1$ and $h'_1=\alpha$, where $\gamma=\max\{|h'_0|, |h'_1|\}=1$.

In this case, to-be-sent signal information of the antennas corresponding to the two channels of the RRU system is:

$$\begin{bmatrix} TY_0 \\ TY_1 \end{bmatrix} = \begin{bmatrix} \frac{h'_0 TX_0}{\gamma} \\ \frac{h'_1 TX_0}{\gamma} \end{bmatrix} = \begin{bmatrix} TX_0 \\ \alpha TX_0 \end{bmatrix}.$$

Downlink signal information of the two channels is $TX_0$, signal information sent by the antenna 0 $TY_0=TX_0$, and signal information sent by the antenna 1 $TY_1=\alpha TX_0$.

It is assumed that power of each channel of the RRU system in FIG. 2*a* is 1, and total transmit power of the two antennas is $1+\alpha^2$. In this case, because $\alpha$ is less than 1, the total transmit power of the antennas is less than 2, and the antenna corresponding to the channel 1 can use only a part of power. Because quality of a channel from the channel 1 to the UE is poor, the part $\alpha^2$ in the power of the channel 1 of the RRU system serves the UE. However, because $\alpha^2$ is less than 1, power waste is caused on the channel 1 due to poor uplink channel quality, which affects an overall coverage area of the distributed antenna system.

Further, the processing unit shown in FIG. 3 is added, so that power is reallocated to the signal information of the two channels based on quality of an uplink channel between the UE and the distributed antenna system: Better channel sounding signal information indicates better uplink channel quality and larger power allocated to an antenna corresponding to the channel; poorer channel sounding signal information indicates poorer uplink channel quality and smaller power allocated to an antenna corresponding to the channel. In addition, after the allocation is completed, total available channel power remains unchanged, and because larger transmit power is allocated to an antenna with better uplink channel quality, a coverage area of the antenna is increased, and overall power utilization of the distributed antenna system is improved, thereby increasing the overall coverage area of the distributed antenna.

In some embodiments, coverage areas of the antenna 0 and the antenna 1 are different, and the UE is located in the coverage area of the antenna 0 corresponding to the channel 0 and is not located in the coverage area of the antenna 1 corresponding to the channel 1. In this case, the antenna 0 may receive sounding signal information sent by the UE, but the antenna 1 cannot receive the sounding signal information sent by the UE. In this case, the sounding signal information received by the antenna 0 is $RY_0$, the sounding signal information received by the antenna 1 is $RY_1=0$, and the electrical bridge performs first weighting processing on the sounding signal information, so that sub-signal information received by the channel 0 of the RRU is $$\frac{1}{\sqrt{2}}Y_0,$$

and sub-signal information received by the channel 1 of the RRU is $$\frac{-j}{\sqrt{2}}Y_0.$$

The BBU determines, based on the sub-signal information corresponding to the channels, channel weights corresponding to the channel 0 and the channel 1 from the UE to the RRU:

$$h_0=\frac{1}{\sqrt{2}} \text{ and } h_1=\frac{-j}{\sqrt{2}},$$

where $h_0$ is the channel weight corresponding to the channel 0, and $h_1$ is the channel weight corresponding to the channel 1.

In this way, although the antenna 1 corresponding to the channel 1 does not receive the sounding signal information, both the two channels of the RRU system can be used for data transmission, and the signal information received by the two channels has same power but a 90° phase difference.

When the RRU system sends the downlink signal information to the UE, the BBU weights the downlink signal information based on the channel weights. If the downlink signal information of the two channels is $TX_0$, after the BBU weights the signal information of the two channels, the signal information sent by the two channels of the RRU is respectively $$\frac{TX_0}{\sqrt{2}} \text{ and } \frac{-jTX_0}{\sqrt{2}}.$$

In one embodiment, the BBU performs normalization processing on the signal information of the two channels of the RRU. In this case, the signal information sent by the channel 0 is $X_0$, and the signal information sent by the channel 1 is $-jX_0$.

The downlink signal information output by the RRU is input to the electrical bridge from the first side of the electrical bridge, and the electrical bridge performs, based on the second matrix, second weighting processing on the signal information sent by the RRU:

$$\begin{bmatrix} TY_0 \\ TY_1 \end{bmatrix}=\frac{1}{\sqrt{2}}\begin{bmatrix} 1 & j \\ j & 1 \end{bmatrix}\begin{bmatrix} TX_0 \\ -jTX_0 \end{bmatrix}=\frac{1}{\sqrt{2}}\begin{bmatrix} 2TX_0 \\ 0 \end{bmatrix}=\begin{bmatrix} \sqrt{2}TX_0 \\ 0 \end{bmatrix}.$$

Herein, $TY_0$ is signal information sent by the antenna 0, $TY_1$ is signal information sent by the antenna 1, and the second matrix is $$\begin{bmatrix} 1 & j \\ j & 1 \end{bmatrix}.$$

If the electrical bridge performs second weighting processing on the signal information sent by the RRU, the signal information sent by the antenna 0 $TY_0=\sqrt{2}TX_0$, and the signal information sent by the antenna 1 $Y_1=0$, that is, the antenna 1 does not transmit the signal information to the user equipment.

To-be-sent signal information of a single channel of the distributed antenna system is $X_0$, to-be-sent signal information of an antenna corresponding to the channel $\sqrt{2}X_0$ after being processed by the electrical bridge, and transmit power is increased by 3 dB (decibels). In one embodiment, in the distributed antenna system shown in FIG. 3, when an antenna corresponding to only one channel of the RRU system can receive the sounding signal information sent by the UE, the electrical bridge performs first weighting processing, so that the RRU system can use the other channel to transmit signal information; and the electrical bridge performs second weighting processing, so that the signal information sent by the RRU is rectified by the electrical bridge, power of the signal information of the two channels is aggregated on one of the antenna ports, and transmit power of the antenna is increased by 3 dB.

Figure 4:
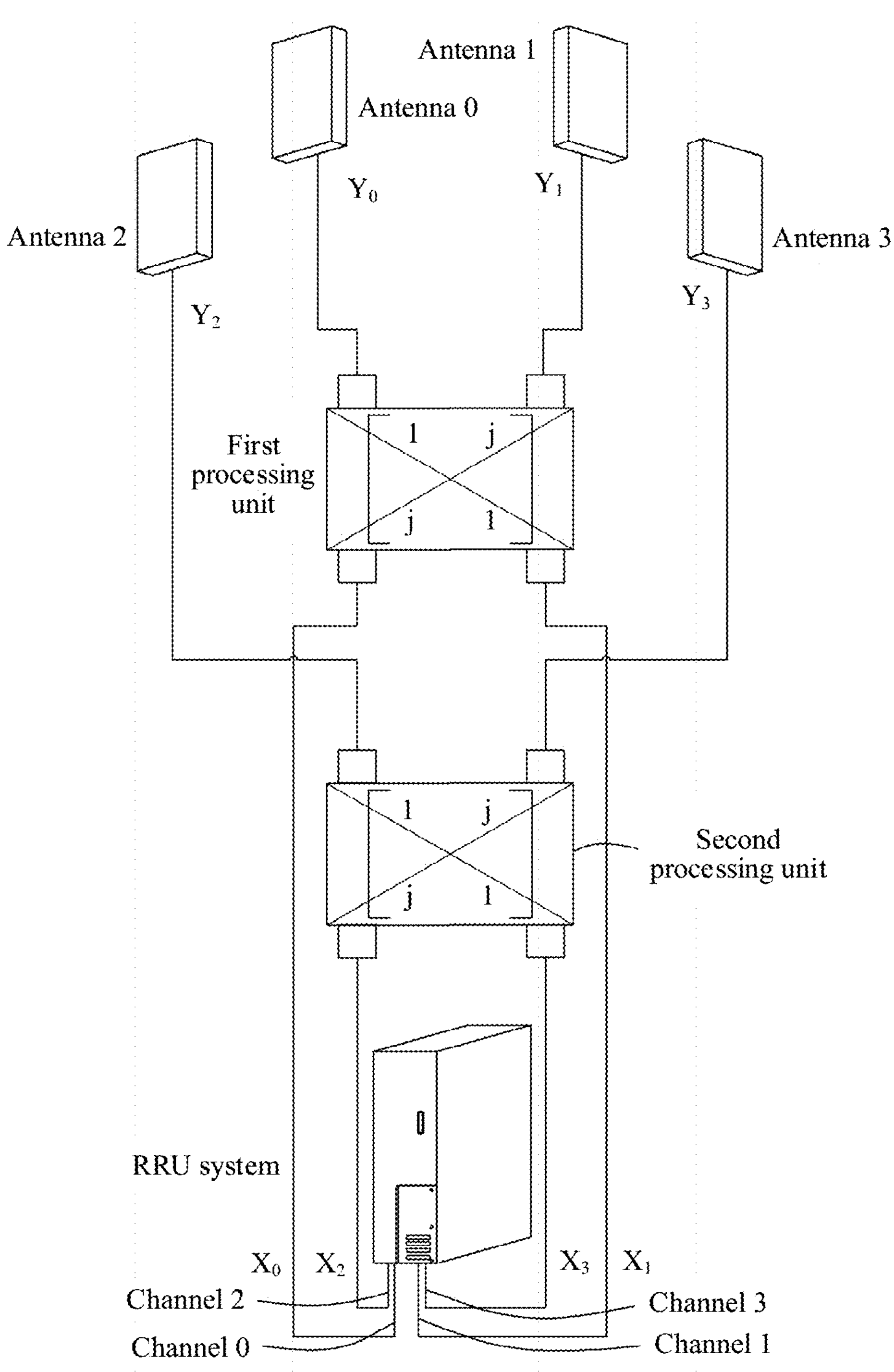
FIG. 4 is a diagram of a four-channel distributed antenna system according to an embodiment of this application.

FIG. 4 is a diagram of a four-channel distributed antenna system that can implement a signal processing method according to this application.

The distributed antenna system shown in FIG. 4 is similar to that in FIG. 3. The distributed antenna system includes an RRU system and an antenna feeder system. A difference lies in that the RRU system has four channels, the antenna feeder system includes four antennas, the distributed antenna system includes two processing units: a first processing unit and a second processing unit, and there are two ports on each of two sides of each of the first processing unit and the second processing unit.

As shown in FIG. 4, an antenna 0 corresponding to a channel 0 and an antenna 2 corresponding to a channel 2 cover adjacent areas, and an antenna 1 corresponding to a channel 1 and an antenna 3 corresponding to a channel 3 cover adjacent areas. One side of the first processing unit is connected to the channel 0 and the channel 1, and the other side is connected to the antenna 0 and the antenna 1. One side of the second processing unit is connected to the channel 2 and the channel 3, and the other side is connected to the antenna 2 and the antenna 3.

When UE is located in the coverage areas of the antenna 0 and the antenna 2 and is not located in the coverage areas of the antenna 1 and the antenna 3, the antenna 0 and the antenna 2 may receive sounding signal information sent by the UE, but the antenna 1 and the antenna 3 cannot receive the sounding signal information sent by the UE. The first processing unit performs, based on a first matrix, first weighting processing on the sounding signal information input by the antenna 0 and the antenna 1, and the second processing unit performs, based on the first matrix, first weighting processing on the sounding signal information input by the antenna 2 and the antenna 3, to transmit signal information obtained after the first weighting processing to the RRU system. A BBU of the RRU system determines, based on the sounding signal information obtained after the first weighting processing, channel weights corresponding to the channels. When the RRU system sends downlink signal information to the UE, the BBU weights the downlink signal information based on the channel weight, and inputs signal information obtained after the weighting processing to the first processing unit and the second processing unit. The first processing unit and the second processing unit perform second weighting processing on the input signal information based on a second matrix, and transmit, by using the corresponding antennas, signal information obtained after the weighting processing.

In the distributed antenna system in FIG. 4, the first processing unit performs power reallocation on the antenna 0 corresponding to the channel 0 and the antenna 1 corresponding to the channel 1, and the second processing unit performs power reallocation on the antenna 2 corresponding to the channel 2 and the antenna 3 corresponding to the channel 3, so that transmit power of the antennas is increased by 3 dB. Power sharing method is described in the foregoing embodiment in FIG. 3, and is not described herein again.

In an embodiment, the first matrix is $$\begin{bmatrix} 1 & j \\ j & 1 \end{bmatrix}^{-1}.$$

In an embodiment, circuit forms of the first processing unit and the second processing unit each may be an electrical bridge device.

Figure 5:
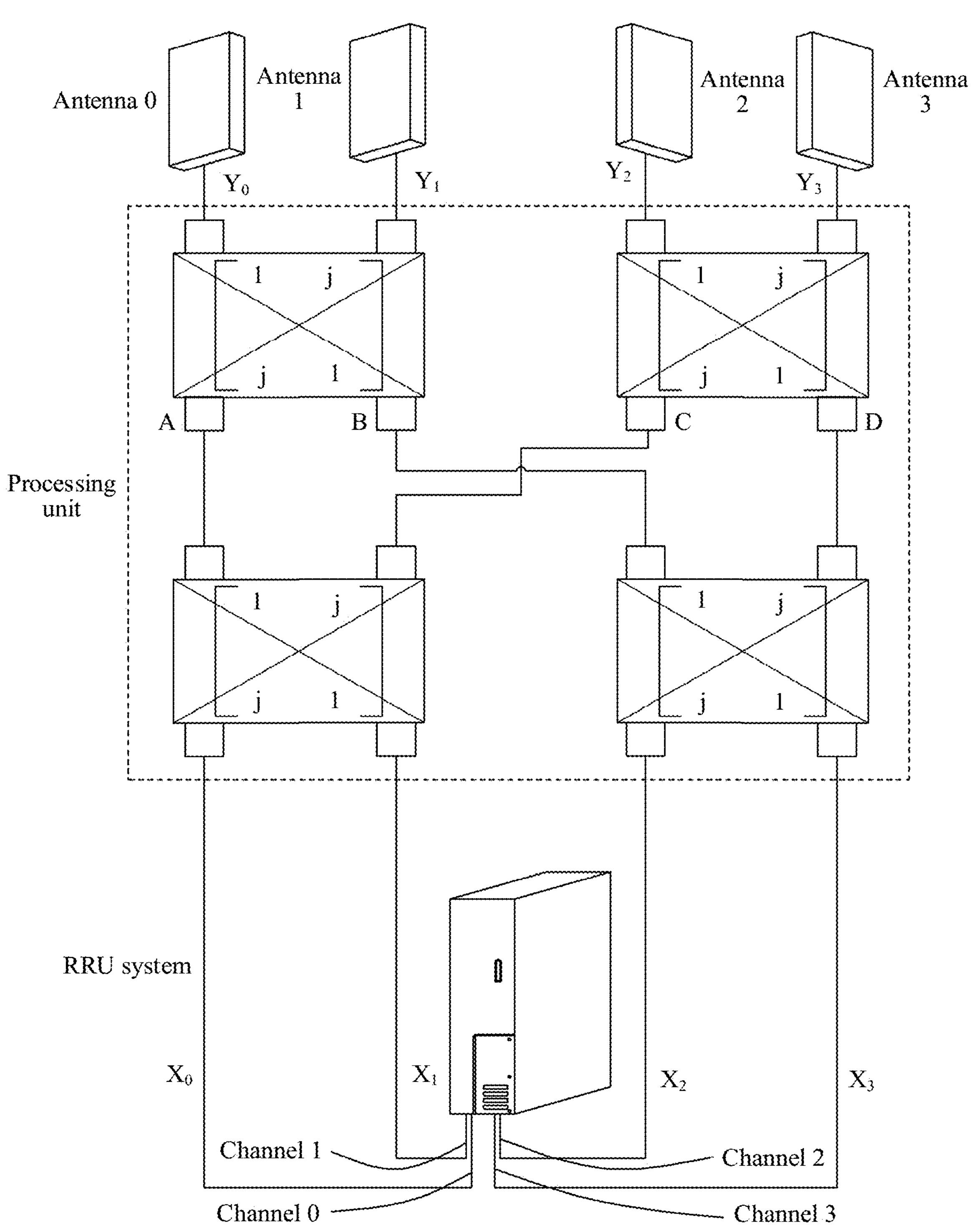
FIG. 5 is a diagram of another four-channel distributed antenna system according to an embodiment of this application.

FIG. 5 is a diagram of another four-channel distributed antenna system that can implement a signal processing method according to this application.

The distributed antenna system shown in FIG. 5 is similar to that in FIG. 3. The distributed antenna system includes an RRU system and an antenna feeder system. A difference lies in that there are four ports on each of two sides of a processing unit of the distributed antenna system, the RRU system has four channels, and the antenna feeder system includes four antennas, where a quantity of ports of the processing unit is equal to a quantity of channels of the RRU system and a quantity of antennas, and the ports are in one-to-one correspondence with the channels and the antennas.

When UE is located in a coverage area of the antenna 0 and is not in coverage areas of the antenna 1, the antenna 2, and the antenna 3, the antenna 0 may receive sounding signal information sent by the UE, where the received sounding signal information is $RY_0$, and the antenna 1, the antenna 2, and the antenna 3 cannot receive the sounding signal information sent by the UE, where the received sounding signal information is $RY_1=RY_2=RY_3=0$. The processing unit performs, based on a first matrix, first weighting processing on the sounding signal information input by the antenna 0, the antenna 1, the antenna 2, and the antenna 3, and signal information obtained after the first weighting processing and transmitted to the RRU system is:

$$\begin{bmatrix} RX_0 \\ RX_1 \\ RX_2 \\ RX_3 \end{bmatrix} = \frac{1}{2}\begin{bmatrix} 1 & j & j & -1 \\ j & -1 & 1 & j \\ j & 1 & -1 & j \\ -1 & j & j & 1 \end{bmatrix}^{-1}\begin{bmatrix} RY_0 \\ RY_1 \\ RY_2 \\ RY_3 \end{bmatrix} = \frac{1}{2}\begin{bmatrix} RY_0 - jRY_1 - jRY_2 - RY_3 \\ -jRY_0 - RY_1 + RY_2 - jRY_3 \\ -jRY_0 + RY_1 - RY_2 - jRY_3 \\ -RY_0 - jRY_1 - jRY_2 + RY_3 \end{bmatrix}.$$

In this case, signal information received by a channel 0, a channel 1, a channel 2, and a channel 3 of the RRU is respectively $$\frac{1}{2}Y_0,\ \frac{-j}{2}Y_0,\ \frac{-j}{2}Y_0,\ \text{and}\ \frac{-1}{2}Y_0.$$

A BBU determines, based on the signal information received by the corresponding channels of the RRU, channel weights corresponding to the channels:

$$h_0 = \frac{1}{2},\ h_1 = \frac{-j}{2},\ h_2 = \frac{-j}{2},\ \text{and}\ h_3 = \frac{-1}{2},$$

where $h_0$ is a channel weight corresponding to the channel 0, $h_1$ is a channel weight corresponding to the channel 1, $h_2$ is a channel weight corresponding to the channel 2, and $h_3$ is a channel weight corresponding to the channel 3.

It may be understood that, for ease of calculation, after determining the channel weights corresponding to the channels, the BBU may perform normalization processing on the channel weights of the channels, to facilitate subsequent calculation. For example, the channel weights corresponding to the foregoing four channels are normalized as $h_0=1$, $h_1=-j$, $h_2=-j$, and $h_3=-1$.

When the RRU system sends downlink signal information $TX_0$ to the UE, the BBU respectively weights, based on the channel weights, downlink signal information corresponding to the four channels, where weighted downlink signal information corresponding to the four channels is respectively $TX_0$, $-jTX_0$, $-jTX_0$, and $-TX_0$.

Then, the RRU system inputs the weighted signal information to the processing unit, and the processing unit performs second weighting processing on the input signal information based on a second matrix:

$$\begin{bmatrix} TY_0 \\ TY_1 \\ TY_2 \\ TY_3 \end{bmatrix} = \frac{1}{2}\begin{bmatrix} 1 & j & j & -1 \\ j & -1 & 1 & j \\ j & 1 & -1 & j \\ -1 & j & j & 1 \end{bmatrix}\begin{bmatrix} TX_0 \\ -jTX_0 \\ -jTX_0 \\ -TX_0 \end{bmatrix} = \begin{bmatrix} 2TX_0 \\ 0 \\ 0 \\ 0 \end{bmatrix}.$$

In this case, signal information transmitted by the antenna 0 is $2TX_0$, and transmit power is four times that of $TX_0$, that is, is increased by 6 dB. A coverage area of the distributed antenna is improved by improving the coverage area of the antenna 0.

In this embodiment, the first matrix is $$\begin{bmatrix} 1 & j & j & -1 \\ j & -1 & 1 & j \\ j & 1 & -1 & j \\ -1 & j & j & 1 \end{bmatrix}^{-1}.$$

In an embodiment, a circuit form of the processing unit may be an electrical bridge device.

Figure 6:
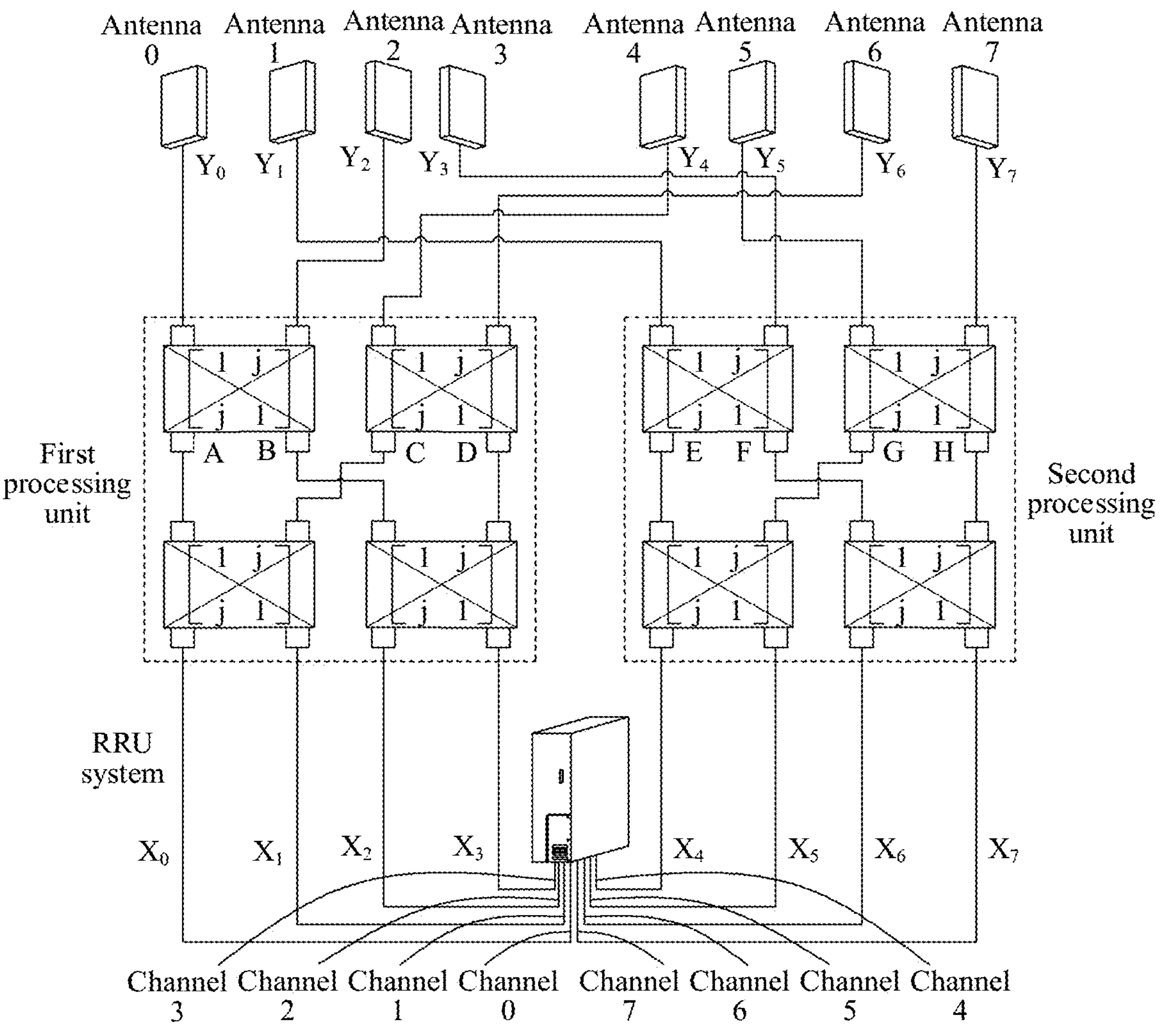
FIG. 6 is a diagram of an eight-channel distributed antenna system according to an embodiment of this application.

FIG. 6 is a diagram of an eight-channel distributed antenna system that can implement a signal processing method according to this application.

The distributed antenna system shown in FIG. 6 is similar to that in FIG. 5. The distributed antenna system includes an RRU system and an antenna feeder system. A difference lies in that the RRU system has eight channels, the antenna feeder system includes eight antennas, the distributed antenna system includes two processing units: a third processing unit and a fourth processing unit, and there are four ports on each of two sides of each of the third processing unit and the fourth processing unit.

The processing unit in FIG. 6 is the same as the processing unit shown in FIG. 5, and a first matrix is also $$\begin{bmatrix} 1 & j & j & -1 \\ j & -1 & 1 & j \\ j & 1 & -1 & j \\ -1 & j & j & 1 \end{bmatrix}^{-1}.$$

In addition, the processing unit shown in FIG. 6 may also be implemented by an electrical bridge device. Therefore, the processing unit determines channel weights based on sounding signal information sent by UE, and weights to-be-sent signal information based on the channel weights. Through both weighting and weighting processing, transmit power is reallocated to the channels, so that transmit power of an antenna on which the UE is located is increased by 6 dB. A signal information processing procedure shown in FIG. 6 is the same as that in FIG. 5, and details are not described herein again.

Figure 7:
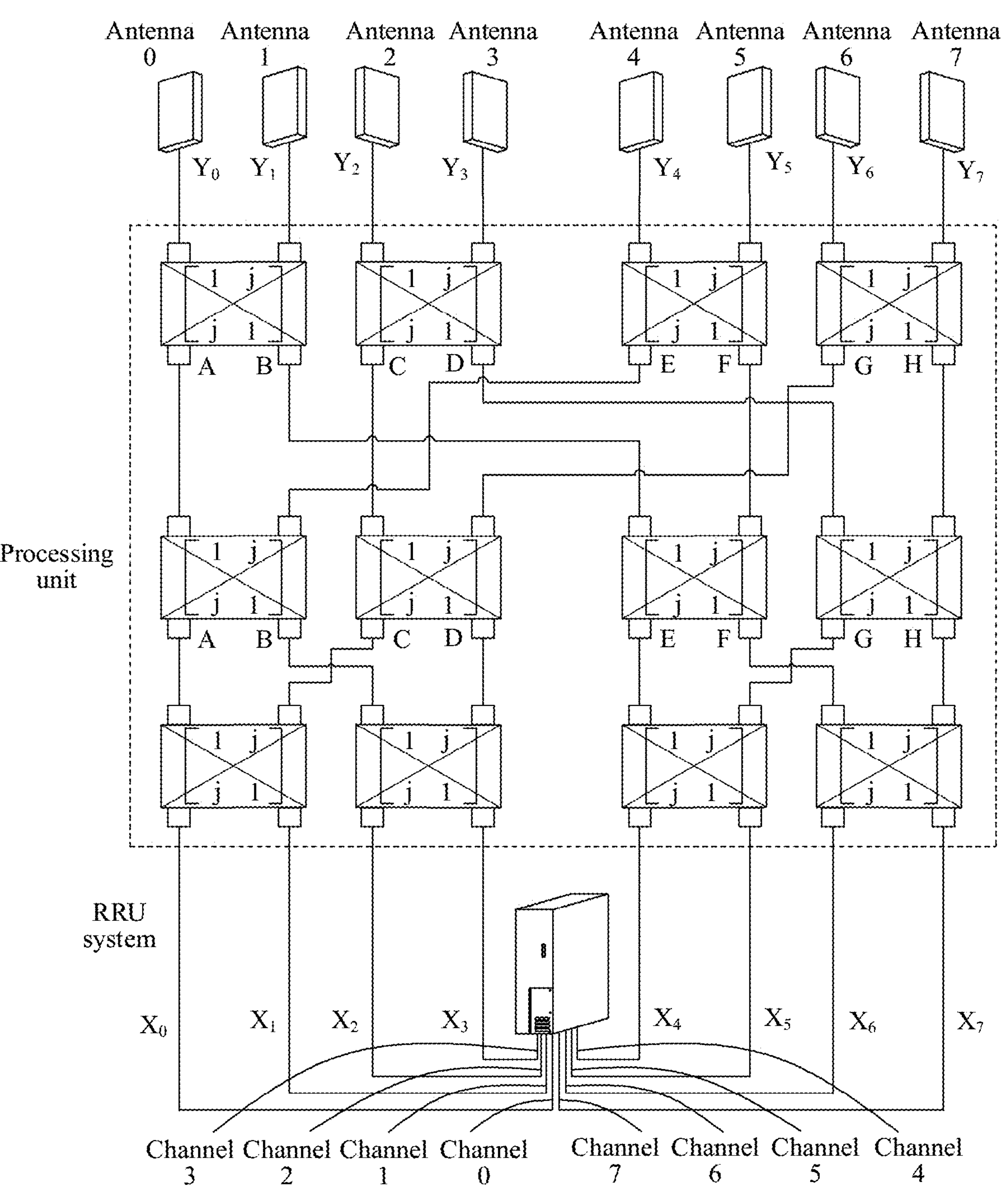
FIG. 7 is a diagram of another eight-channel distributed antenna system according to an embodiment of this application.

FIG. 7 is a diagram of another eight-channel distributed antenna system that can implement a signal processing method according to this application.

The distributed antenna system shown in FIG. 7 is similar to that in FIG. 3. The distributed antenna system includes an RRU system and an antenna feeder system. A difference lies in that there are eight ports on each of two sides of a processing unit of the distributed antenna system, the RRU system has eight channels, and the antenna feeder system includes eight antennas.

When UE is located in a coverage area of an antenna 0 and is not in coverage areas of the antenna 1, the antenna 2, the antenna 3, the antenna 4, the antenna 5, the antenna 6, and the antenna 7, the antenna 0 may receive sounding signal information sent by the UE, where the received sounding signal information is $RY_0$, and the antenna 1, the antenna 2, the antenna 3, the antenna 4, the antenna 5, the antenna 6, and the antenna 7 cannot receive the sounding signal information sent by the UE, where the received sounding signal information is $RY_1=RY_2=RY_3=RY_4=RY_5=RY_6=RY_7=0$. The processing unit performs, based on a first matrix, first weighting processing on the sounding signal information input by the antenna 0, the antenna 1, the antenna 2, the antenna 3, the antenna 4, the antenna 5, the antenna 6, and the antenna 7, and signal information obtained after the first weighting processing and transmitted to the RRU system is:

$$\begin{bmatrix} RX_0 \\ RX_1 \\ RX_2 \\ RX_3 \\ RX_4 \\ RX_5 \\ RX_6 \\ RX_7 \end{bmatrix} = \frac{1}{2\sqrt{2}} \begin{bmatrix} 1 & -j & -j & -1 & -j & -1 & -1 & j \\ -j & -1 & 1 & -j & -1 & j & -j & -1 \\ -j & -1 & -1 & j & 1 & -j & -j & -1 \\ -1 & j & -j & -1 & -j & -1 & 1 & -j \\ -j & 1 & -1 & -j & -1 & -j & j & -1 \\ -1 & -j & -j & 1 & j & -1 & -1 & -j \\ -1 & -j & j & -1 & -j & 1 & -1 & -j \\ j & -1 & -1 & -j & -1 & -j & -j & 1 \end{bmatrix} \begin{bmatrix} RY_0 \\ RY_1 \\ RY_2 \\ RY_3 \\ RY_4 \\ RY_5 \\ RY_6 \\ RY_7 \end{bmatrix}.$$

In this case, signal information received by a channel 0, a channel 1, a channel 2, a channel 3, a channel 4, a channel 5, a channel 6, and a channel 7 of the RRU is respectively $$\frac{1}{2\sqrt{2}}RY_0,\ \frac{-j}{2\sqrt{2}}RY_0,\ \frac{-j}{2\sqrt{2}}RY_0,\ \frac{-1}{2\sqrt{2}}RY_0,$$

-continued $$\frac{-j}{2\sqrt{2}}RY_0,\ \frac{-1}{2\sqrt{2}}RY_0,\ \frac{-1}{2\sqrt{2}}RY_0, \text{ and } \frac{j}{2\sqrt{2}}RY_0.$$

A BBU determines, based on the signal information received by the corresponding channels of the RRU, channel weights corresponding to the channels:

$$h_0 = \frac{1}{2\sqrt{2}},\ h_1 = \frac{-j}{2\sqrt{2}},\ h_2 = \frac{-j}{2\sqrt{2}},\ h_3 = \frac{-1}{2\sqrt{2}},$$
$$h_4 = \frac{-j}{2\sqrt{2}},\ h_5 = \frac{-1}{2\sqrt{2}},\ h_6 = \frac{-1}{2\sqrt{2}}, \text{ and } h_7 = \frac{j}{2\sqrt{2}},$$

where $h_0$ is a channel weight corresponding to the channel 0, $h_1$ is a channel weight corresponding to the channel 1, $h_2$ is a channel weight corresponding to the channel 2, $h_3$ is a channel weight corresponding to the channel 3, $h_4$ is a channel weight corresponding to the channel 4, $h_5$ is a channel weight corresponding to the channel 5, $h_6$ is a channel weight corresponding to the channel 6, and $h_7$ is a channel weight corresponding to the channel 7.

It may be understood that, for ease of calculation, after determining the channel weights corresponding to the channels, the BBU may perform normalization processing on the channel weights of the channels, to facilitate subsequent calculation. For example, the channel weights corresponding to the foregoing eight channels are normalized as $h_0=1$, $h_1=-j$, $h_2=-j$, $h_3=-1$, $h_4=-j$, $h_5=-1$, $h_6=-1$, and $h_7=j$.

When the RRU system sends downlink signal information $TX_0$ to the UE, the BBU respectively weights, based on the channel weights, downlink signal information corresponding to the eight channels, where weighted signal information is respectively $TX_0$, $-jTX_0$, $-jTX_0$, $-TX_0$, $-jTX_0$, $-TX_0$, $-TX_0$, and $jTX_0$.

Then, the RRU system inputs the weighted signal information to the processing unit, and the processing unit performs second weighting processing on the input signal information based on a second matrix:

$$\begin{bmatrix} TY_0 \\ TY_1 \\ TY_2 \\ TY_3 \\ TY_4 \\ TY_5 \\ TY_6 \\ TY_7 \end{bmatrix} = \frac{1}{2\sqrt{2}} \begin{bmatrix} 1 & j & j & -1 & j & -1 & -1 & -j \\ j & -1 & -1 & -j & 1 & j & j & -1 \\ j & 1 & -1 & j & -1 & j & -j & -1 \\ -1 & j & -j & -1 & j & 1 & -1 & j \\ j & -1 & 1 & j & -1 & -j & j & -1 \\ -1 & -j & j & -1 & j & -1 & 1 & j \\ -1 & j & j & 1 & -j & -1 & -1 & j \\ -j & -1 & -1 & j & -1 & j & j & 1 \end{bmatrix} \begin{bmatrix} TX_0 \\ -jTX_0 \\ -jTX_0 \\ -TX_0 \\ -jTX_0 \\ -TX_0 \\ -TX_0 \\ jTX_0 \end{bmatrix} = \begin{bmatrix} 2\sqrt{2}\,TX_0 \\ 0 \\ 0 \\ 0 \\ 0 \\ 0 \\ 0 \\ 0 \end{bmatrix}.$$

In this case, signal information transmitted by the antenna 0 is $2\sqrt{2}TX_0$, and transmit power is eight times that of $TX_0$, that is, is increased by 9 dB. A coverage area of the distributed antenna is improved by improving the coverage area of the antenna 0.

In this embodiment, the first matrix is $$\begin{bmatrix} 1 & -j & -j & -1 & -j & -1 & -1 & j \\ -j & -1 & 1 & -j & -1 & j & -j & -1 \\ -j & -1 & -1 & j & 1 & -j & -j & -1 \\ -1 & j & -j & -1 & -j & -1 & 1 & -j \\ -j & 1 & -1 & -j & -1 & -j & j & -1 \\ -1 & -j & -j & 1 & j & -1 & -1 & -j \\ -1 & -j & j & -1 & -j & 1 & -1 & -j \\ j & -1 & -1 & -j & -1 & -j & -j & 1 \end{bmatrix}.$$

In an embodiment, a circuit form of the processing unit may be an electrical bridge device.

It may be understood that the foregoing embodiments are merely described by using an example in which a quantity of channels of the RRU system is 2, 4, or 8. The quantity of channels in embodiments of this application is not limited to 2, 4, or 8, provided that the quantity of channels in the RRU is greater than or equal to 2, and coverage areas of antennas corresponding to the two or more channels are different.

Further, that coverage areas of two antennas are different includes two scenarios: The coverage areas of the two antennas are different and have an overlapping area, and the coverage areas of the two antennas are different and have no overlapping area. This application supports at least the foregoing two scenarios.

In the foregoing embodiments provided in this application, the quantity of channels of the RRU system is equal to the quantity of antennas and the quantity of ports on each side of the processing unit, and the channels are in one-to-one correspondence with the antennas and the ports. It may be understood that, in other embodiments, the quantity of channels of the RRU system is different from the quantity of antennas. For example, the RRU has three channels, and only two of the channels are connected to corresponding antennas by using the processing unit.

Figure 8:
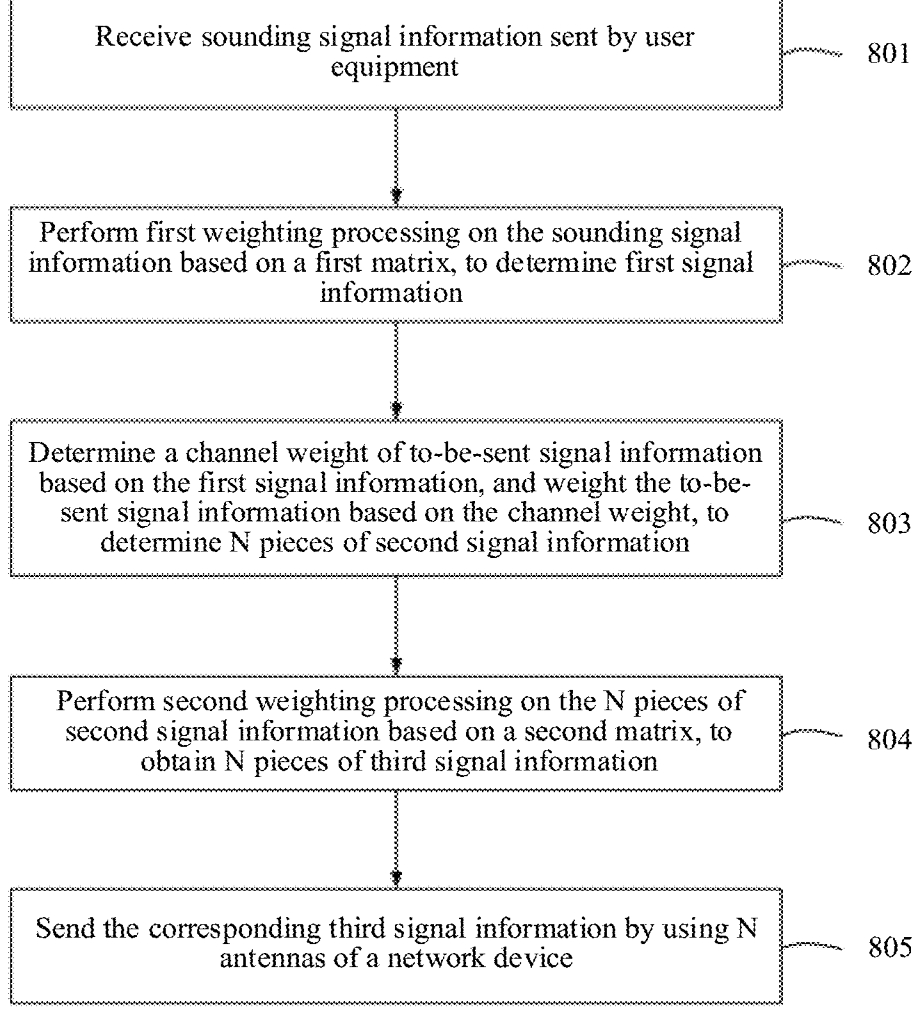
FIG. 8 is a schematic flowchart of a signal processing method according to an embodiment of this application.

Refer to FIG. 8. The following describes an example of a signal processing method provided in an embodiment of this application.

801: Receive sounding signal information sent by user equipment.

The sounding signal information includes N pieces of sub-sounding signal information received by N antennas of a network device, and N is an integer greater than or equal to 2.

In an embodiment, the network device has N antennas, and the N antennas have N coverage areas. When the UE is located in the coverage area of the antenna, to obtain quality of an uplink channel between the network device and the UE, the UE sends the sounding signal information to the network device, and the antenna of the network device is configured to receive the sounding signal information. If the UE is located in the coverage area of the antenna, the antenna may receive the sounding signal information sent by the UE. Otherwise, the antenna cannot receive the sounding signal information sent by the UE.

The network device may be the distributed antenna system described in the foregoing embodiments.

It may be understood that in another embodiment, obtaining the sounding signal information is not limited to directly receiving a signal sent by a user, and the sounding signal information may be directly or indirectly obtained in another manner. A manner of obtaining the sounding signal information is not limited in this application.

802: Perform first weighting processing on the sounding signal information based on a first matrix, to determine first signal information.

In one embodiment, the N pieces of first sub-sounding signal information may form an input matrix with N rows and 1 column or with 1 row and N columns, and the matrix is multiplied by the first matrix to obtain a corresponding matrix with N rows and 1 column or an output matrix with 1 row and N columns. The output matrix is the first signal information, and the first signal information includes the N pieces of first sub-signal information.

The first matrix is an N-dimensional unitary matrix, and the first matrix is a matrix determined by a Kronecker product obtained by multiplying N matrices $$\begin{bmatrix} 1 & j \\ j & 1 \end{bmatrix} \text{ or } \begin{bmatrix} 1 & -j \\ -j & 1 \end{bmatrix}.$$

In some embodiments, a processing unit is newly disposed between an antenna and an RRU, so that the processing unit performs, based on the first matrix, first weighting processing on signal information transmitted by the antenna to the RRU. Power of the entire RRU can be flexibly allocated by adjusting the N pieces of sub-sounding signal information through the first weighting processing, without being limited by rated power of a single channel.

A circuit form of the processing unit is an electrical bridge device, the electrical bridge device has a first side and a second side, the antenna is connected to the second side of the electrical bridge device, the RRU is connected to the first side of the electrical bridge device, the electrical bridge device performs, based on the first matrix, first weighting processing on the signal information input by the antennas, and the electrical bridge device performs, based on an inverse matrix of the first matrix, second weighting processing on signal information input by the RRU. For a step of weighting processing, refer to the foregoing embodiments. Details are not described herein again.

In some embodiments, if N=2, a mathematical form of the first matrix is $$\begin{bmatrix} 1 & j \\ j & 1 \end{bmatrix};$$

if N=4, a mathematical form of the first matrix is $$\begin{bmatrix} 1 & j & j & -1 \\ j & -1 & 1 & j \\ j & 1 & -1 & j \\ -1 & j & j & 1 \end{bmatrix};$$

or if N=8, a mathematical form of the first matrix is $$\begin{bmatrix} 1 & j & j & -1 & j & -1 & -1 & -j \\ j & -1 & -1 & -j & 1 & j & j & -1 \\ j & 1 & -1 & j & -1 & j & -j & -1 \\ -1 & j & -j & -1 & j & 1 & -1 & j \\ j & -1 & 1 & j & -1 & -j & j & -1 \\ -1 & -j & j & -1 & j & -1 & 1 & j \\ -1 & j & j & 1 & -j & -1 & -1 & j \\ -j & -1 & -1 & j & -1 & j & j & 1 \end{bmatrix}.$$

In other embodiments, if N=2, a mathematical form of the first matrix is $$\begin{bmatrix} 1 & j \\ j & 1 \end{bmatrix}^{-1};$$

if N=4, a mathematical form of the first matrix is $$\begin{bmatrix} 1 & j & j & -1 \\ j & -1 & 1 & j \\ j & 1 & -1 & j \\ -1 & j & j & 1 \end{bmatrix}^{-1};$$

or if N=8, a mathematical form of the first matrix is $$\begin{bmatrix} 1 & j & j & -1 & j & -1 & -1 & -j \\ j & -1 & -1 & -j & 1 & j & j & -1 \\ j & 1 & -1 & j & -1 & j & -j & -1 \\ -1 & j & -j & -1 & j & 1 & -1 & j \\ j & -1 & 1 & j & -1 & -j & j & -1 \\ -1 & -j & j & -1 & j & -1 & 1 & j \\ -1 & j & j & 1 & -j & -1 & -1 & j \\ -j & -1 & -1 & j & -1 & j & j & 1 \end{bmatrix}^{-1}.$$

In the foregoing embodiment, N=2M, and M is an integer greater than or equal to 1, that is, N is an even number greater than or equal to 2. It may be understood that N may alternatively be an odd number greater than 2, provided that the first matrix changes correspondingly.

803: Determine a channel weight of to-be-sent signal information based on the first signal information, and weight the to-be-sent signal information based on the channel weight, to determine N pieces of second signal information.

In one embodiment, the first signal information includes the N pieces of first sub-signal information, the first sub-signal information is obtained by performing first weighting processing on the sounding signal information obtained by the antennas, and each piece of first sub-signal information corresponds to one channel of the RRU. A BBU may determine, based on the first sub-signal information, the channel weight of the to-be-sent signal information corresponding to the channel, and weight, based on the channel weight, the to-be-sent signal information corresponding to the channel, to obtain the second signal information.

If the sounding signal information received by the antennas has different values, the antennas correspond to different first sub-signal information. Therefore, channel weights of channels corresponding to different first sub-signal information are also different. In this way, the channel weight of the RRU channel corresponding to the antenna may be determined by using the sounding signal information that is sent by the UE and that is received by the antenna. That is, the channel weight is not fixed, but may be changed in real time based on quality of an uplink channel between the UE and the network device.

For example, the network device has two channels, and channel weights of the two channels that are determined by the BBU based on the first signal information are respectively 3 and 4. If to-be-sent signal information of each of the two channels is $TX_0$, two pieces of second signal information obtained after the BBU weights the channels based on the channel weights corresponding to the channels are respectively $3TX_0$ and $4TX_0$.

It may be understood that an amount of signal information transmitted between the antenna and the RRU is the same as a quantity of antennas.

804: Perform second weighting processing on the N pieces of second signal information based on a second matrix, to obtain N pieces of third signal information.

The second matrix is an inverse matrix of the first matrix.

In some embodiments, a processing unit is newly disposed between an antenna and an RRU, so that the processing unit performs, based on a second matrix, second weighting processing on signal information transmitted by the RRU to the antenna. For a step of weighting processing, refer to the foregoing embodiments. Details are not described herein again.

805: Send the corresponding third signal information by using the N antennas of the network device.

The antennas are in one-to-one correspondence with the third signal information, and the antennas transmit the corresponding third signal information.

In this way, first weighting processing is performed, based on the first matrix, on the sounding signal information received by the antennas, to adjust at least two pieces of sounding signal information, and the corresponding sounding signal information is adjusted based on uplink channel quality corresponding to the channels. The BBU determines, based on adjusted sounding signal information, the channel weights corresponding to the channels, performs, based on the channel weights of the corresponding channels, weighting processing on downlink signal information sent to the UE, and performs, based on the second matrix, second weighting processing on downlink signal information obtained after the weighting processing. In this way, power is reallocated to the channels based on the uplink channel quality of the channels, so as to increase power of a channel with better uplink channel quality and reduce power of channel with poorer uplink quality. The power corresponding to the channels is re-adjusted, so as to improve coverage areas of antennas corresponding to the channels, thereby improving an overall coverage area of a system.

Figure 9:
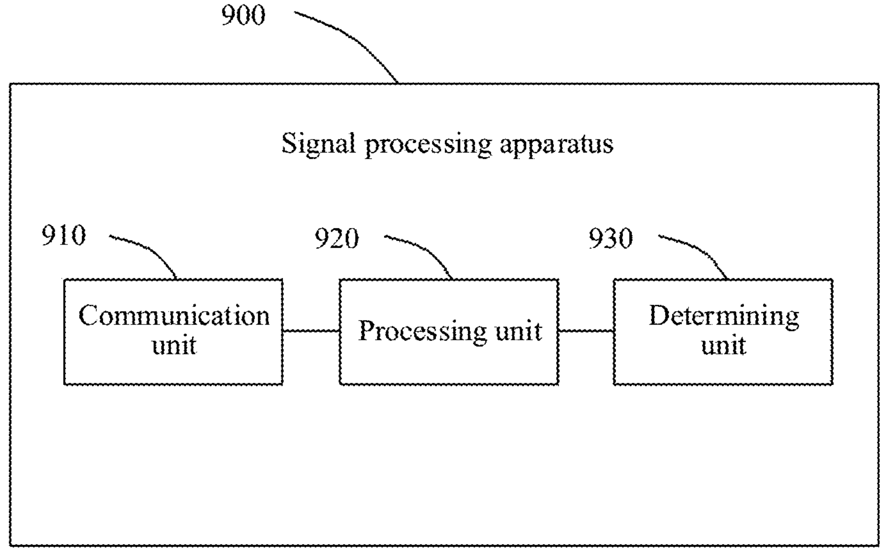
FIG. 9 is a schematic composition diagram of a signal processing apparatus according to an embodiment of this application.

FIG. 9 shows a signal processing apparatus 900 according to an embodiment of this application. The signal processing apparatus 900 includes:

- a communication unit 910, configured to receive sounding signal information from user equipment, where the sounding signal information includes N pieces of sub-sounding signal information received by N antennas of a network device, and N is an integer greater than or equal to 2;
- a processing unit 920, configured to perform first weighting processing on the sounding signal information based on a first matrix, to determine first signal information, where the first matrix is an N-dimensional unitary matrix, and the first matrix is a matrix determined by a Kronecker product obtained by multiplying N matrices $$\begin{bmatrix} 1 & j \\ j & 1 \end{bmatrix} \text{ or } \begin{bmatrix} 1 & -j \\ -j & 1 \end{bmatrix};$$

and

- a determining unit 930, configured to: determine a channel weight of to-be-sent signal information based on the first signal information, and weight the to-be-sent signal information based on the channel weight, to determine N pieces of second signal information.

The processing unit 920 is further configured to perform second weighting processing on the N pieces of second signal information based on a second matrix, to obtain N pieces of third signal information, where the second matrix is an inverse matrix of the first matrix.

The communication unit 910 is further configured to send the corresponding third signal information by using the N antennas.

In one embodiment, coverage areas of at least two of the N antennas are different.

In one embodiment, N=2M, and M is an integer greater than or equal to 1.

In one embodiment, if N=2, a mathematical form of the second matrix is $$\begin{bmatrix} 1 & j \\ j & 1 \end{bmatrix};$$

if N=4, a mathematical form of the second matrix is $$\begin{bmatrix} 1 & j & j & -1 \\ j & -1 & 1 & j \\ j & 1 & -1 & j \\ -1 & j & j & 1 \end{bmatrix};$$

or if N=8, a mathematical form of the second matrix is $$\begin{bmatrix} 1 & j & j & -1 & j & -1 & -1 & -j \\ j & -1 & -1 & -j & 1 & j & j & -1 \\ j & 1 & -1 & j & -1 & j & -j & -1 \\ -1 & j & -j & -1 & j & 1 & -1 & j \\ j & -1 & 1 & j & -1 & -j & j & -1 \\ -1 & -j & j & -1 & j & -1 & 1 & j \\ -1 & j & j & 1 & -j & -1 & -1 & j \\ -j & -1 & -1 & j & -1 & j & j & 1 \end{bmatrix}.$$

In one embodiment, the second signal information is in one-to-one correspondence with the third signal information, and the third signal information is in one-to-one correspondence with the antennas.

In one embodiment, the signal processing apparatus 900 may be a network device (for example, a base station) or a chip configured in the network device.

It should be understood that the signal processing apparatus 900 herein is presented in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a combined logic circuit, and/or another suitable component that supports the described function.

In an optional example, a person skilled in the art may understand that the signal processing apparatus 900 may be the distributed antenna system in the foregoing embodiments, and the signal processing apparatus 900 may be configured to perform corresponding procedures and/or operations in the foregoing method embodiment. To avoid repetition, details are not described herein again.

Figure 10:
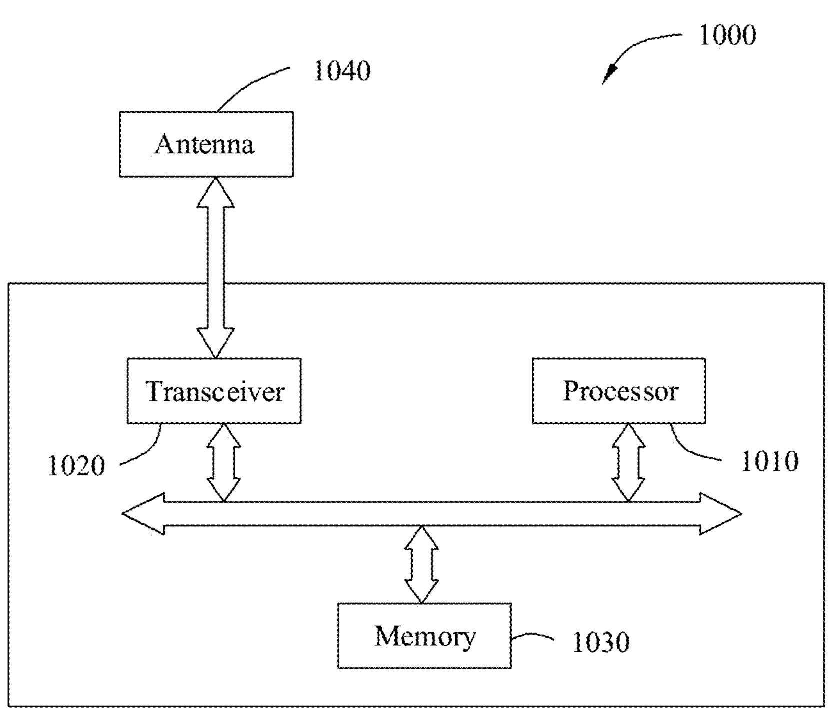
FIG. 10 is a schematic composition diagram of a network device according to an embodiment of this application.

FIG. 10 is a diagram of a structure of a network device 1000 (for example, a base station or a distributed antenna system) according to an embodiment of this application. As shown in FIG. 10, the network device 1000 includes a processor 1010 and a transceiver 1020. In one embodiment, the network device 1000 further includes a memory 1030. The processor 1010, the transceiver 1020, and the memory 1030 communicate with each other through an internal connection path, to transfer control and/or data signal information. The memory 1030 is configured to store a computer program. The processor 1010 is configured to invoke the computer program from the memory 1030 and run the computer program, to control the transceiver 1020 to send or receive signal information.

The processor 1010 and the memory 1030 may be integrated into one processing apparatus. The processor 1010 is configured to execute program code stored in the memory 1030, to implement the foregoing functions. During some implementations, the memory 1030 may alternatively be integrated into the processor 1010, or may be independent of the processor 1010.

The network device may further include an antenna 1040, configured to send, by using radio signal information, downlink data or downlink control signaling output by the transceiver 1020.

In one embodiment, the network device 1000 may correspond to a base station or the distributed antenna system in the signal processing method in embodiments of this application. The network device 1000 may include modules configured to perform the method performed by the distributed antenna system in the signal processing method in FIG. 8. In addition, the modules in the network device 1000 and the foregoing other operations and/or functions are separately used to implement corresponding procedures of the signal processing method in FIG. 8. In one embodiment, the memory 1030 is configured to store program code, which is used to control the antenna 1040 to perform operation 801, control the transceiver 1020 to perform operation 802 in the method, control the processor 1010 to perform operation 803, control the transceiver 1020 to perform operation 804 in the method, and control the antenna 1040 to perform operation 805. Processes of performing the foregoing corresponding operations by the modules are described in detail in the method. For brevity, details are not described herein again.

Figure 11:
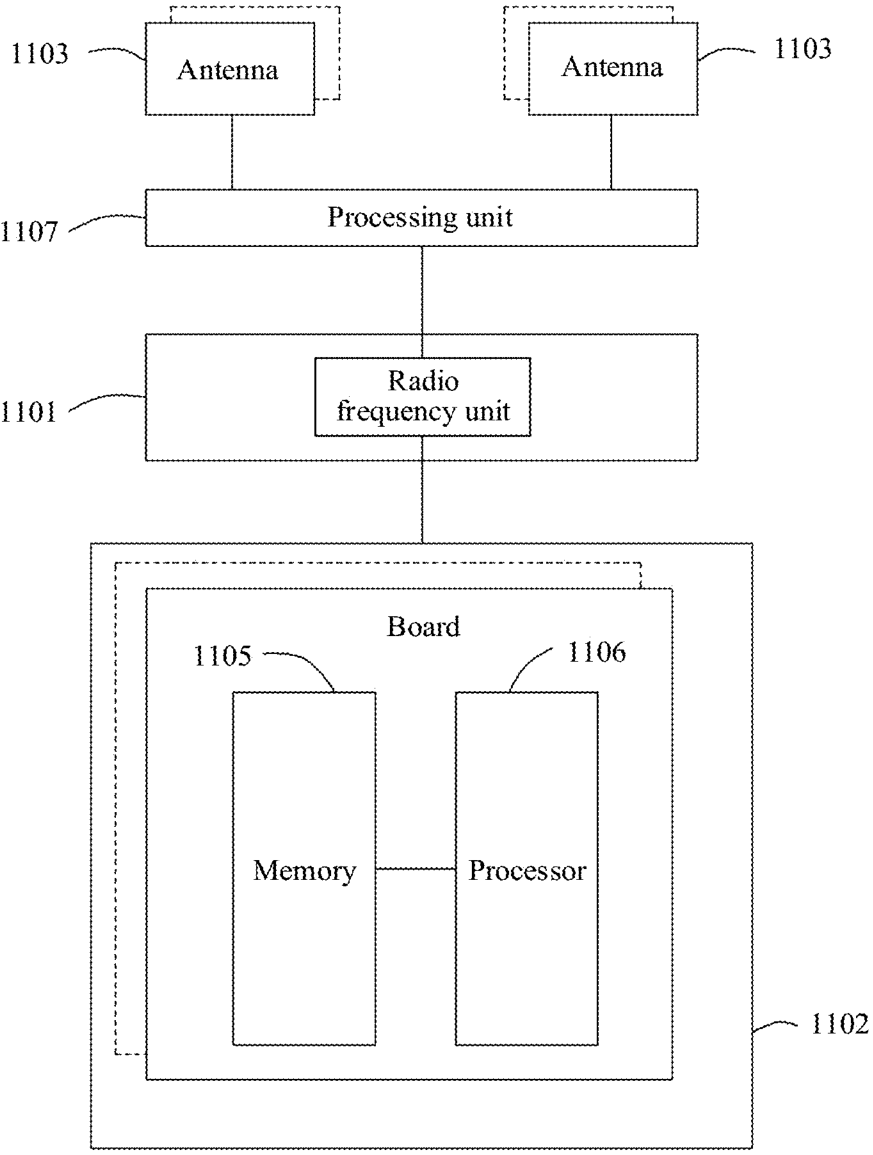
FIG. 11 is a diagram of a structure of a network device according to an embodiment of this application.

FIG. 11 is a diagram of a structure of a network device 1100 according to an embodiment of this application. The network device 1100 may be configured to implement functions of the distributed antenna system in the foregoing method. For example, FIG. 11 may be a diagram of a structure of a base station. As shown in FIG. 11, the base station may be used in the systems shown in FIG. 3 to FIG. 7. The base station includes one or more radio frequency units such as remote radio units (RRUs) 1101 and one or more baseband units BBUs 1102 (which may also be referred to as digital units (DUs)). The RRU 1101 may be referred to as a transceiver unit, a transceiver, a transceiver circuit, or the like, and may include at least one antenna 1103, a radio frequency unit 1104, and a processing unit 1107. The RRU is mainly configured to: receive and send a radio frequency signal, and perform conversion between the radio frequency signal and a baseband signal, for example, send the signaling message in the foregoing embodiments to a terminal device. The BBU 1102 is mainly configured to: perform baseband processing, control the base station, and the like. The BBU 1102 is a control center of the base station. For example, the BBU 1102 may be configured to control the network device 1100 to perform an operation procedure related to the base station in the foregoing method embodiment, and the processing unit 1107 is configured to perform a weighting processing procedure in the foregoing method embodiment.

In an example, the BBU 1102 may include one or more boards, and a plurality of boards may jointly support a wireless access network of a single access standard (such as an LTE system or an NR system), or may separately support wireless access networks of different access standards. The BBU 1102 further includes a memory 1105 and a processor 1106. The memory 1105 is configured to store instructions and data. For example, the memory 1105 stores the codebook and the like in the foregoing embodiments. The processor 1106 is configured to control the base station to perform an action, for example, control the base station to perform the operation procedure related to the network device in the foregoing method embodiment. The memory 1105 and the processor 1106 may serve one or more boards. In other words, a memory and a processor may be disposed on each board. Alternatively, a plurality of boards may share a same memory and a same processor. In addition, a circuit may be further disposed on each board.

In a possible implementation, with development of a system-on-chip (SoC) technology, all or some functions of the BBU 1102 and the RRU 1101 may be implemented through the SoC technology, for example, implemented through a base station function chip. The base station function chip integrates components such as a processor, a memory, and an antenna port. Programs for related functions of the base station are stored in the memory and executed by the processor to implement related functions of the base station. In one embodiment, the base station function chip can also read an external memory of the chip, to implement related functions of the base station.

It should be understood that the structure of the base station shown in FIG. 11 is merely a possible form, but should not constitute any limitation on embodiments of this application. In this application, a possibility that there may be a base station structure in another form in the future is not excluded.

It should be understood that the processor in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not limitation, many forms of random access memories (RAMs) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

According to the method provided in embodiments of this application, this application further provides a computer program product. The computer program product includes computer program code. When the computer program code is run on a computer, the computer is enabled to perform the method in the embodiment shown in FIG. 8.

According to the method provided in embodiments of this application, this application further provides a computer-readable medium. The computer-readable medium stores program code. When the program code is run on a computer, the computer is enabled to perform the method in the embodiment shown in FIG. 8.

According to the method provided in embodiments of this application, this application further provides a system. The system includes the foregoing network device and one or more terminal devices. All or some of the foregoing embodiments may be implemented using software, hardware, firmware, or any combination thereof. When software is used to implement embodiments, all or some of the foregoing embodiments may be implemented in a form of a computer program product. The computer program product includes one or more computer instructions. When the computer program instructions are loaded or executed on a computer, all or some of the procedures or functions according to embodiments of this application are generated. The computer may be a general-purpose computer, a dedicated computer, a computer network, or another programmable apparatus. The computer instructions may be stored in a non-transitory computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that in embodiments of this application, terms such as "first", "second", "third" are merely used to differentiate between different objects, and shall not constitute any limitation on this application. For example, the terms are used to differentiate between different signals, different matrices, and different processing manners.

It should be further understood that, in embodiments of this application, "antenna" and "antenna port" are often used alternately, but a person skilled in the art may understand meanings of the "antenna" and the "antenna port". It should be noted that meanings expressed by the terms are consistent when differences of the terms are not emphasized. The antenna port may be understood as a transmit antenna identified by a receive end device, or a transmit antenna that can be identified in space. One antenna port is configured for each virtual antenna, each virtual antenna may be a weighted combination of a plurality of physical antennas, and each antenna port may correspond to one reference signal port.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, division into the modules is merely logical function division and may be other division in an actual implementation. For example, a plurality of modules or components may be combined or integrated into another system. In addition, the displayed or discussed mutual coupling or communication connection may be indirect coupling or a communication connection performed through some interfaces, apparatuses, or units.

In addition, functional units in embodiments of this application may be integrated into one physical entity, or each unit may independently correspond to one physical entity, or two or more units may be integrated into one physical entity.

When the functions are implemented in the form of a software functional unit and sold or used as an independent product, the functions may be stored in a computer-readable storage medium. Based on such an understanding, the technical solutions of this application essentially, or the part contributing to the conventional technology, some of the technical solutions may be implemented in the form of a software product. The computer software product is stored in a storage medium and includes several instructions for instructing a computer device (which may be a personal computer, a server, a network device, or the like) to perform all or some of the operations of the method described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A signal processing method, performed by a network device, wherein the method comprises:

receiving sounding signal information from user equipment, wherein the sounding signal information comprises N pieces of sub-sounding signal information received by N antennas of the network device, and N is an integer greater than or equal to 2;

performing first weighting processing on the sounding signal information based on a first matrix to determine first signal information, wherein the first matrix is an N-dimensional unitary matrix;

determining a channel weight of to-be-sent signal information based on the first signal information and weighting the to-be-sent signal information based on the channel weight to determine N pieces of second signal information;

performing second weighting processing on the N pieces of second signal information based on a second matrix to obtain N pieces of third signal information, wherein the second matrix is an inverse matrix of the first matrix; and sending the corresponding third signal information using the N antennas of the network device.

2. The method according to claim 1, wherein coverage areas of at least two of the N antennas are different.

3. The method according to claim 1, wherein N=2M, M is an integer greater than or equal to 1, and the first matrix is a matrix determined by a Kronecker product obtained by multiplying N matrices $$\begin{bmatrix} 1 & j \\ j & 1 \end{bmatrix} \text{ or } \begin{bmatrix} 1 & -j \\ -j & 1 \end{bmatrix}.$$

4. The method according to claim 3, wherein when N=2, a mathematical form of the second matrix is $$\begin{bmatrix} 1 & j \\ j & 1 \end{bmatrix};$$

when N=4, a mathematical form of the second matrix is;

$$\begin{bmatrix} 1 & j & j & -1 \\ j & -1 & 1 & j \\ j & 1 & -1 & j \\ -1 & j & j & 1 \end{bmatrix};$$

or when N=8, a mathematical form of the second matrix is $$\begin{bmatrix} 1 & j & j & -1 & j & -1 & -1 & -j \\ j & -1 & -1 & -j & 1 & j & j & -1 \\ j & 1 & -1 & j & -1 & j & -j & -1 \\ -1 & j & -j & -1 & j & 1 & -1 & j \\ j & -1 & 1 & j & -1 & -j & j & -1 \\ -1 & -j & j & -1 & j & -1 & 1 & j \\ -1 & j & j & 1 & -j & -1 & -1 & j \\ -j & -1 & -1 & j & -1 & j & j & 1 \end{bmatrix}.$$

5. The method according to claim 1, wherein the second signal information is in one-to-one correspondence with the third signal information, and the third signal information is in one-to-one correspondence with the N antennas.

6. A signal processing apparatus, comprising:

a processor; and a memory coupled to the processor with computer readable instructions stored thereon, wherein the instructions, when executed by the processor, enable the apparatus to:

receive sounding signal information sent by user equipment, wherein the sounding signal information comprises N pieces of sub-sounding signal information received by N antennas of a network device, and Nis an integer greater than or equal to 2;

perform first weighting processing on the sounding signal information based on a first matrix to determine first signal information, wherein the first matrix is an N-dimensional unitary matrix;

determine a channel weight of to-be-sent signal information based on the first signal information and weight the to-be-sent signal information based on the channel weight to determine N pieces of second signal information;

perform second weighting processing on the N pieces of second signal information based on a second matrix to obtain N pieces of third signal information, wherein the second matrix is an inverse matrix of the first matrix; and send the corresponding third signal information using the N antennas.

7. The apparatus according to claim 6, wherein coverage areas of at least two of the N antennas are different.

8. The apparatus according to claim 6, wherein N=2M, M is an integer greater than or equal to 1, and the first matrix is a matrix determined by a Kronecker product obtained by multiplying N matrices $$\begin{bmatrix} 1 & j \\ j & 1 \end{bmatrix} \text{ or } \begin{bmatrix} 1 & -j \\ -j & 1 \end{bmatrix}.$$

9. The apparatus according to claim 8, wherein when N=2, a mathematical form of the second matrix is $$\begin{bmatrix} 1 & j \\ j & 1 \end{bmatrix};$$

when N=4, a mathematical form of the second matrix is $$\begin{bmatrix} 1 & j & j & -1 \\ j & -1 & 1 & j \\ j & 1 & -1 & j \\ -1 & j & j & 1 \end{bmatrix};$$

or when N=8, a mathematical form of the second matrix is $$\begin{bmatrix} 1 & j & j & -1 & j & -1 & -1 & -j \\ j & -1 & -1 & -j & 1 & j & j & -1 \\ j & 1 & -1 & j & -1 & j & -j & -1 \\ -1 & j & -j & -1 & j & 1 & -1 & j \\ j & -1 & 1 & j & -1 & -j & j & -1 \\ -1 & -j & j & -1 & j & -1 & 1 & j \\ -1 & j & j & 1 & -j & -1 & -1 & j \\ -j & -1 & -1 & j & -1 & j & j & 1 \end{bmatrix}.$$

10. The apparatus according to claim 6, wherein the second signal information is in one-to-one correspondence with the third signal information, and the third signal information is in one-to-one correspondence with the N antennas.

11. A non-transitory computer-readable storage medium, comprising a computer program, wherein, when the computer program runs on a computer, cause the computer to:

receive sounding signal information from user equipment, wherein the sounding signal information comprises N pieces of sub-sounding signal information received by N antennas of a network device, and N is an integer greater than or equal to 2;

perform first weighting processing on the sounding signal information based on a first matrix to determine first signal information, wherein the first matrix is an N-dimensional unitary matrix;

determine a channel weight of to-be-sent signal information based on the first signal information and weighting the to-be-sent signal information based on the channel weight to determine N pieces of second signal information;

perform second weighting processing on the N pieces of second signal information based on a second matrix to obtain N pieces of third signal information, wherein the second matrix is an inverse matrix of the first matrix; and send the corresponding third signal information using the N antennas of the network device.

12. The non-transitory computer-readable storage medium according to claim 11, wherein coverage areas of at least two of the N antennas are different.

13. The non-transitory computer-readable storage medium according to claim 11, wherein N=2M, M is an integer greater than or equal to 1, and the first matrix is a matrix determined by a Kronecker product obtained by multiplying N matrices $$\begin{bmatrix} 1 & j \\ j & 1 \end{bmatrix} \text{ or } \begin{bmatrix} 1 & -j \\ -j & 1 \end{bmatrix}.$$

14. The non-transitory computer-readable storage medium according to claim 13, wherein when N=2, a mathematical form of the second matrix is $$\begin{bmatrix} 1 & j \\ j & 1 \end{bmatrix};$$

when N=4, a mathematical form of the second matrix is $$\begin{bmatrix} 1 & j & j & -1 \\ j & -1 & 1 & j \\ j & 1 & -1 & j \\ -1 & j & j & 1 \end{bmatrix};$$

or when N=8, a mathematical form of the second matrix is $$\begin{bmatrix} 1 & j & j & -1 & j & -1 & -1 & -j \\ j & -1 & -1 & -j & 1 & j & j & -1 \\ j & 1 & -1 & j & -1 & j & -j & -1 \\ -1 & j & -j & -1 & j & 1 & -1 & j \\ j & -1 & 1 & j & -1 & -j & j & -1 \\ -1 & -j & j & -1 & j & -1 & 1 & j \\ -1 & j & j & 1 & -j & -1 & -1 & j \\ -j & -1 & -1 & j & -1 & j & j & 1 \end{bmatrix}.$$

15. The non-transitory computer-readable storage medium according to claim 11, wherein the second signal information is in one-to-one correspondence with the third signal information, and the third signal information is in one-to-one correspondence with the N antennas.

* * * * *